(12) United States Patent
Kuramoto et al.

(10) Patent No.: US 8,893,553 B2
(45) Date of Patent: Nov. 25, 2014

(54) ZERO/SPAN ADJUSTABLE LINKAGE MOVEMENT FOR MEASURING DEVICES

(75) Inventors: Tomiyuki Kuramoto, Bridgeport, CT (US); Yoshikazu Kaneko, Stratford, CT (US)

(73) Assignee: Ashcroft, Inc., Stratford, CT (US)

( * ) Notice: Subject to any disclaimer, the term of this patent is extended or adjusted under 35 U.S.C. 154(b) by 280 days.

(21) Appl. No.: 13/592,593

(22) Filed: Aug. 23, 2012

(65) Prior Publication Data

US 2013/0047733 A1  Feb. 28, 2013

Related U.S. Application Data

(60) Provisional application No. 61/526,491, filed on Aug. 23, 2011.

(51) Int. Cl.
*G01L 7/00* (2006.01)
*G01L 7/10* (2006.01)
*G01L 7/04* (2006.01)
*G01D 11/30* (2006.01)

(52) U.S. Cl.
CPC ........... *G01L 7/048* (2013.01); *G01L 7/041* (2013.01); *G01D 11/30* (2013.01)
USPC .................................. 73/700; 73/732; 73/741

(58) Field of Classification Search
None
See application file for complete search history.

(56) References Cited

U.S. PATENT DOCUMENTS

| | | |
|---|---|---|
| 980,403 A | 1/1911 | Blanchard et al. |
| 987,039 A | 3/1911 | Blanchard et al. |
| 1,072,415 A | 9/1913 | Azadian |
| 1,127,295 A | 2/1915 | Shebol et al. |
| 1,165,934 A | 12/1915 | Amthor |
| 1,274,921 A | 8/1918 | Manning |
| 1,751,867 A | 3/1930 | Manuel |
| 1,773,378 A | 8/1930 | Ruopp |
| 1,874,765 A | 8/1932 | Lammedee |
| 1,883,557 A | 10/1932 | Cheney |
| 1,893,388 A | 1/1933 | Bayer |
| 1,904,492 A | 4/1933 | Manuel |
| 1,937,879 A | 12/1933 | Eshbaugh |
| 1,937,888 A | 12/1933 | Harada |
| 1,937,928 A | 12/1933 | Wedin |
| 1,978,750 A | 10/1934 | Klein |
| 1,987,673 A | 6/1935 | Ferrier |
| 2,326,574 A | 8/1943 | Shaw |
| 2,377,755 A | 6/1945 | Buechmann |
| 2,466,519 A | 4/1949 | Wantz et al. |
| 2,483,635 A | 10/1949 | Grant |
| 2,497,974 A | 2/1950 | Bourns |
| 2,632,421 A | 3/1953 | Perkins |
| 3,127,771 A | 4/1964 | Diehl |
| 3,307,406 A | 3/1967 | Oliver et al. |
| 3,371,539 A | 3/1968 | Neyer |
| 3,745,001 A | 7/1973 | Lawford et al. |
| 4,055,085 A | 10/1977 | Wetterhorn |

(Continued)

*Primary Examiner* — Andre Allen
(74) *Attorney, Agent, or Firm* — McCarter & English, LLP

(57) ABSTRACT

The present disclosure provides for systems and methods for fabricating measuring devices, e.g., a pressure gauge, thermometer or the like. More particularly, the present disclosure provides for systems and methods for fabricating measuring device assemblies having zero/span adjustable linkage movements (e.g., zero/span adjustable four-bar linkage movements). In general, the present disclosure provides for measuring device assemblies having zero/span adjustable linkage movements, wherein the zero/span adjustable linkage movements do not adversely affect linearity of the measuring device assemblies, and wherein the measuring device assemblies are rugged and able to withstand certain extreme shock and/or vibration conditions.

20 Claims, 18 Drawing Sheets

(56) References Cited

U.S. PATENT DOCUMENTS

| | | |
|---|---|---|
| 4,083,251 A | 4/1978 | Forster |
| 4,109,537 A * | 8/1978 | Gorgens et al. .............. 73/756 |
| 4,161,888 A | 7/1979 | Bissell |
| 4,196,633 A | 4/1980 | Bissell |
| 4,237,738 A | 12/1980 | Wetterhorn |
| 4,240,298 A * | 12/1980 | Wetterhorn .................. 73/732 |
| 4,246,796 A | 1/1981 | Wetterhorn |
| 4,270,568 A * | 6/1981 | Gray ............................ 137/498 |
| 4,292,840 A | 10/1981 | Nguyen |
| 4,444,057 A * | 4/1984 | Wetterhorn .................. 73/739 |
| 4,682,501 A | 7/1987 | Walker |
| 5,349,866 A | 9/1994 | Huang |
| 6,295,876 B1 | 10/2001 | Busch |
| 7,503,222 B1 | 3/2009 | Bessette |
| 7,891,250 B2 | 2/2011 | Parias |

* cited by examiner

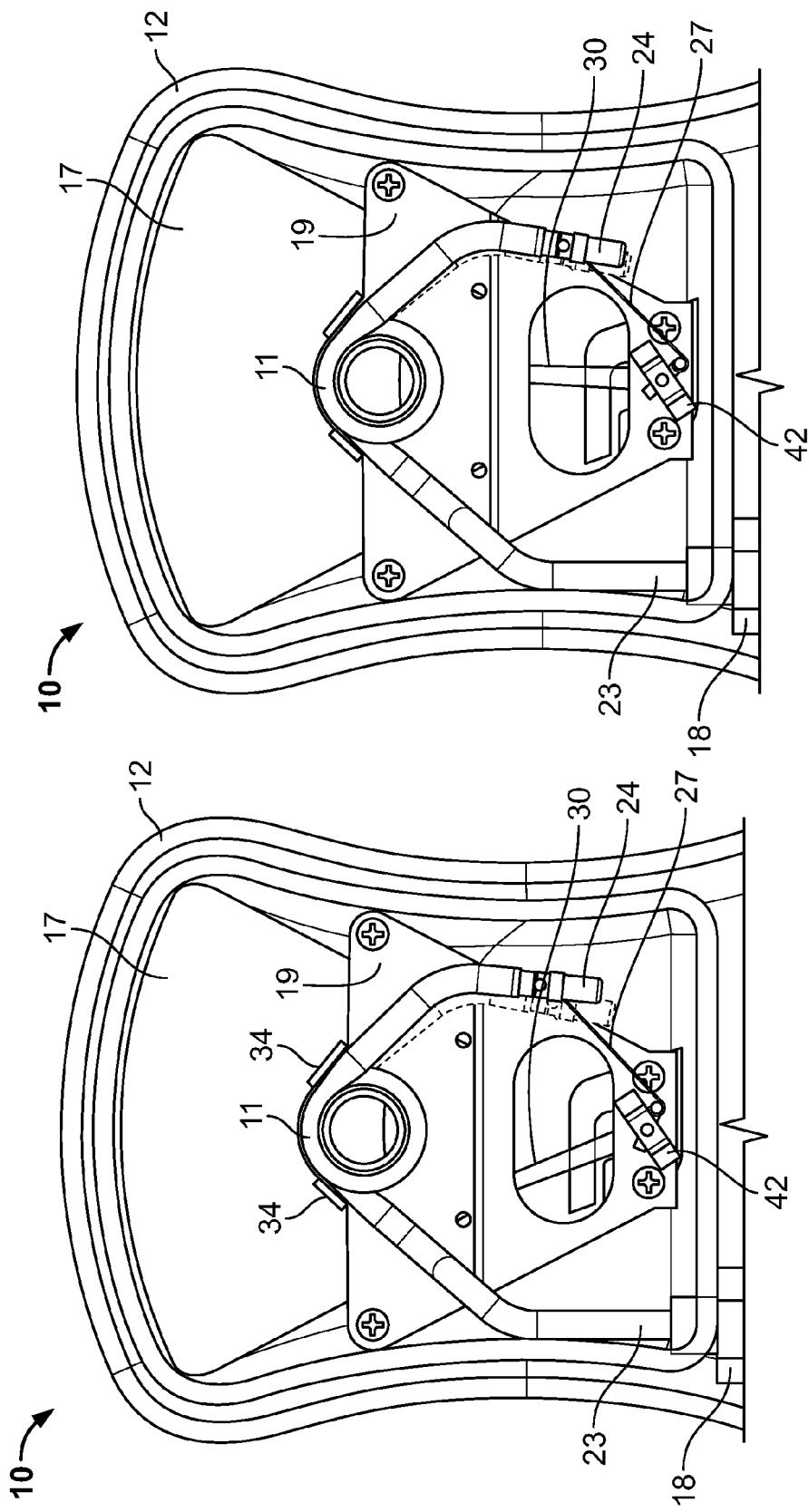

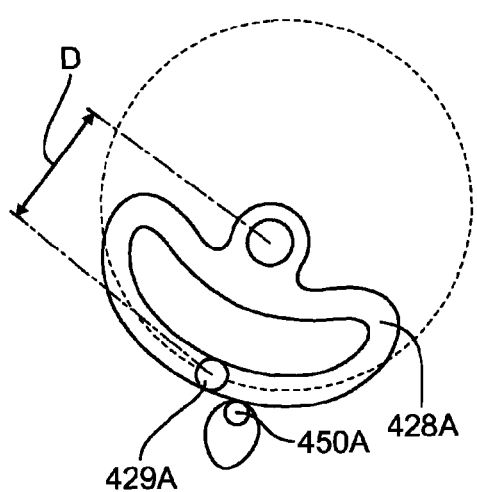
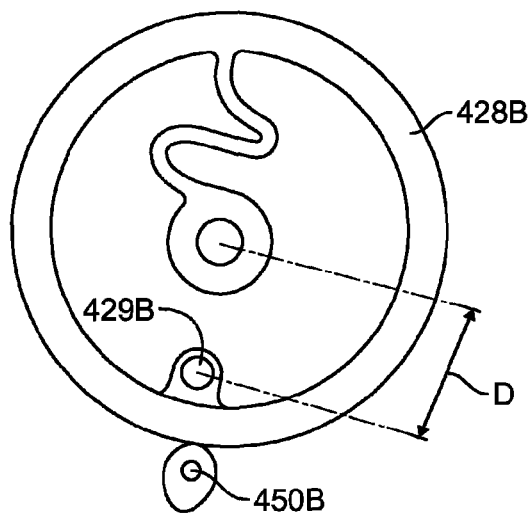
FIG. 13A     FIG. 13B
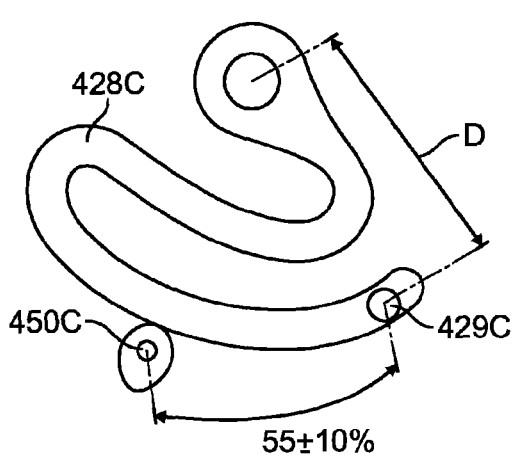
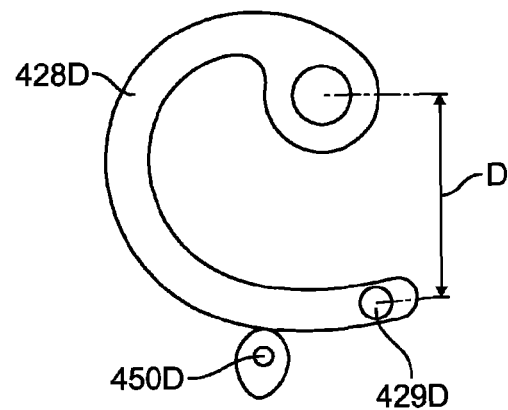
FIG. 13C     FIG. 13D
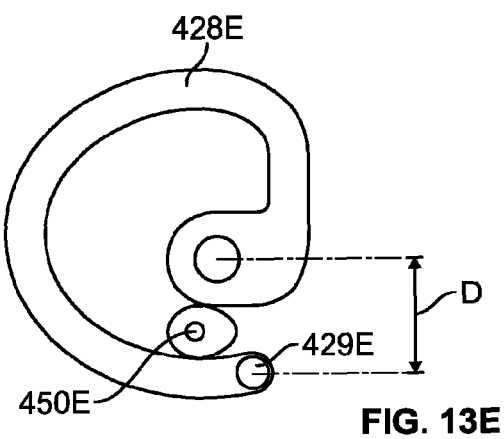
FIG. 13E

| Analytical Model: | | Units | | | Equations (Brodell and Soni Analytic Method) | |
|---|---|---|---|---|---|---|
| Between Fixed Points | r1 | inches | 1.24544135 | Set Rocker = 1 | r3/r1 | 0.602 |
| Crank Length | r2 | inches | 0.10452846 | | r4/r1 | 0.803 |
| Coupler Length | r3 | inches | 0.74970018 | | r2/r1 | 0.084 |
| Rocker Length | r4 | inches | 1 | | | |
| Rocker Angle | Φ | degrees | 12 | | | |
| Min. Transmission Angle Solver | Y | degrees | 80 | Min. 30 deg. Req'd for Quality Movement | | |
| | | Solve | | | | |

| Rocker Angle (Input) | Crank Angle (Output) | Formula |
|---|---|---|
| 148 | 197.2459 | 0.99964183 |
| 147 | 182.0315 | 0.99998393 |
| 146 | -63.1378 | 0.99985646 |
| 145 | -52.3352 | 1.00009602 |
| 144 | 149.0945 | 1.00000418 |
| 143 | 139.4585 | 0.99981812 |
| 142 | 130.0487 | 1.00029044 |
| 141 | 120.3114 | 1.0000931 |
| 140 | 110.2078 | 1.00068436 |
| 139 | 98.70895 | 1.00012176 |

| Angle Input | Crank Angle, 1 | Crank Angle, 2 |
|---|---|---|
| 148 | 197.316 | -91.2331 |
| 147 | 181.9326 | -75.5775 |
| 146 | 169.855 | -63.1777 |
| 145 | 159.081 | -52.1918 |
| 144 | 148.9897 | -42.2155 |
| 143 | 139.4953 | -32.6725 |
| 142 | 129.9695 | -23.2812 |
| 141 | 120.278 | -13.6519 |
| 140 | 109.9391 | -3.49603 |
| 139 | 98.69346 | 7.663334 |
| 138 | 84.94397 | 21.40435 |

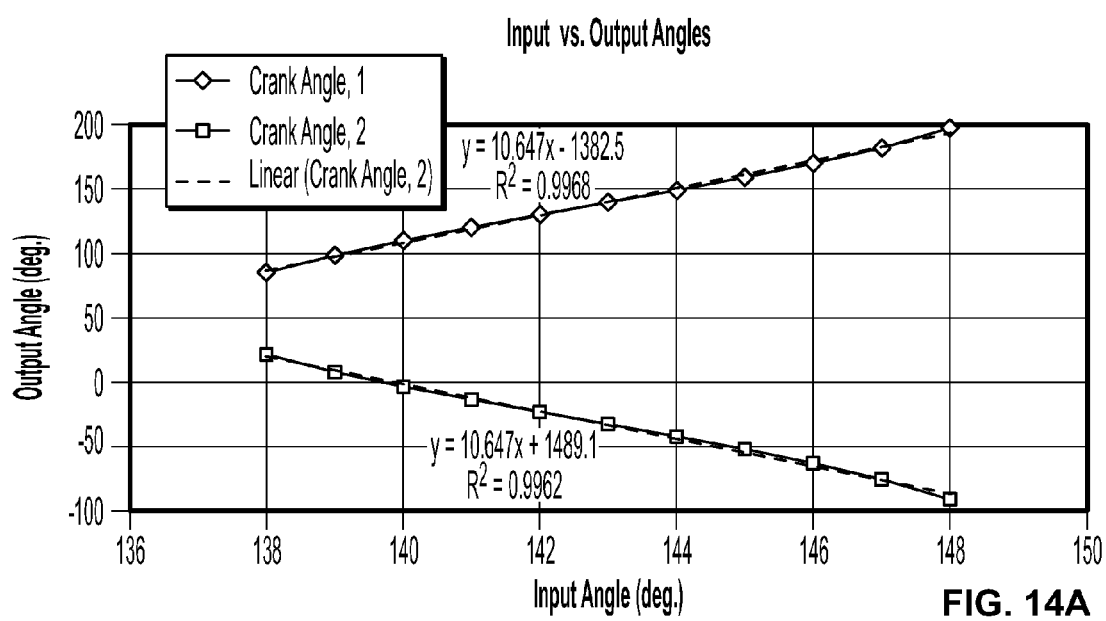

FIG. 14A

| Analytical Model: | Units | | Original | | | Equations | |
|---|---|---|---|---|---|---|---|
| Between Fixed Points | r1 | inches | 1.24544135 | 1.24544135 | | r3/r1 | 0.602 |
| Crank Length | r2 | inches | 0.08452846 | 0.10452846 | | r4/r1 | 0.803 |
| Coupler Length | r3 | inches | 0.74970018 | 0.74970018 | | r2/r1 | 0.084 |
| Rocker Length | r4 | inches | 1 | 1 | | | |
| Rocker Angle | φ | degrees | | 12 | | | |
| Min. Transmission | γ | degrees | | 80 | Min. 30 deg. Req'd for Quality Movement | | |
| Angle Solver | | Solve | | | | | |

| Rocker Angle (Input) | Crank Angle (Output) | Formula |
|---|---|---|
| 148 | 41844833 | 0.99254277 |
| 147 | 197.0633 | 0.99990495 |
| 146 | 178.9487 | 0.99970312 |
| 145 | 164.8204 | 0.99994589 |
| 144 | 151.9844 | 0.99913245 |
| 143 | 140.2819 | 0.99999931 |
| 142 | 128.4711 | 0.99999674 |
| 141 | 116.2437 | 1.00004012 |
| 140 | 102.8439 | 1.00028328 |
| 139 | 86.12208 | 1.00010262 |
| 138 | -7.6E+14 | #NUM! |
| 137 | 5.03E+15 | #NUM! |
| 136 | 8.97E+15 | #NUM! |

| Angle Input | +.020 | +.010 | Original | -.010 | -.020 |
|---|---|---|---|---|---|
| 148 | 183.74 | 189.74 | 197.32 | | |
| 147 | 173.12 | 177.05 | 181.93 | 188.12 | 197.06 |
| 146 | 163.69 | 166.48 | 169.85 | 173.85 | 178.95 |
| 145 | 154.99 | 156.88 | 159.08 | 161.66 | 164.82 |
| 144 | 146.73 | 147.84 | 148.99 | 150.48 | 151.98 |
| 143 | 138.72 | 139.10 | 139.50 | 139.89 | 140.28 |
| 142 | 130.77 | 130.44 | 129.97 | 129.35 | 128.47 |
| 141 | 122.70 | 121.48 | 120.28 | 118.54 | 116.24 |
| 140 | 114.41 | 112.50 | 109.94 | 106.96 | 102.84 |
| 139 | 105.58 | 102.63 | 98.69 | 93.71 | 86.12 |
| 138 | 95.85 | 91.04 | 84.94 | | |
| Slope | 8.16 | 8.93 | 9.87 | 11.00 | 12.46 |

| Unigauge Span Tolerance | Min | Nom. | Max. |
|---|---|---|---|
| Angle Input | 4.41 | 4.9 | 5.39 |
| Angle Output | 55 | 55 | 55 |
| Required Magnification | 12.47 | 11.22 | 10.20 |

FIG. 16

| Analytical Model: | | Units |
|---|---|---|
| Between Fixed Points | r1 | inches |
| Crank Length | r2 | inches |
| Coupler Length | r3 | inches |
| Rocker Length | r4 | inches |
| Rocker Angle | φ | degrees |
| Min. Transmission | γ | degrees |
| Angle Solver | | Solve |

| Original | |
|---|---|
| 1.24544135 | 1.24544135 |
| 0.10452846 | 0.10452846 |
| 0.74970018 | 0.74970018 |
| 0.98 | 1 |
| | 12 |
| | 80 |

Min. 30 deg. Req'd for Quality Movement

| Equations | |
|---|---|
| r3/r1 | 0.602 |
| r4/r1 | 0.803 |
| r2/r1 | 0.084 |

| Rocker Angle (Input) | Crank Angle (Output) | Formula |
|---|---|---|
| 148 | 193.3894 | 0.9994117 |
| 147 | 179.1377 | 1.0000108 |
| 146 | 167.397 | 1.0000093 |
| 145 | 156.9743 | 1.00000575 |
| 144 | 147.2616 | 1.00000203 |
| 143 | 137.8994 | 0.99999867 |
| 142 | 128.6158 | 0.9999959 |
| 141 | 119.1475 | 0.99999385 |
| 140 | 109.165 | 0.99999274 |
| 139 | 98.12816 | 0.99999238 |
| 138 | 84.94397 | 1.00044775 |
| 137 | 61.58332 | 0.99933953 |
| 136 | 51.62125 | 1.04043295 |

| Angle Input | +.020 | +.010 | Original | -.010 | -.020 |
|---|---|---|---|---|---|
| 148 | 200.6345 | 199.2892 | 197.316028 | 195.3429 | 193.3894 |
| 147 | 184.5151 | 183.3321 | 181.93259 | 180.6419 | 179.1377 |
| 146 | 171.8967 | 170.9094 | 169.854994 | 168.6582 | 167.397 |
| 145 | 160.8478 | 160.0025 | 159.081005 | 158.0651 | 156.9743 |
| 144 | 150.6224 | 149.8964 | 148.989671 | 148.2156 | 147.2616 |
| 143 | 140.801 | 140.1848 | 139.495256 | 138.7337 | 137.8994 |
| 142 | 131.0736 | 130.5667 | 129.969499 | 129.3375 | 128.6158 |
| 141 | 121.1412 | 120.7523 | 120.278018 | 119.7551 | 119.1475 |
| 140 | 110.6222 | 110.3748 | 109.939104 | 109.6459 | 109.165 |
| 139 | 98.69346 | 98.69346 | 98.6934627 | 98.69346 | 98.12816 |
| 138 | 84.52808 | 84.52808 | 84.9439679 | 84.94397 | 84.94397 |

| Analytical Model: | Units | | Original | | | Equations | |
|---|---|---|---|---|---|---|---|
| Between Fixed Points | r1 | inches | 1.22544135 | 1.24544135 | | r3/r1 | 0.602 |
| Crank Length | r2 | inches | 0.10452846 | 0.10452846 | | r4/r1 | 0.803 |
| Coupler Length | r3 | inches | 0.74970018 | 0.74970018 | | r2/r1 | 0.084 |
| Rocker Length | r4 | inches | 1 | 1 | | | |
| Rocker Angle | Φ | degrees | | 12 | | | |
| Min. Transmission | γ | degrees | | 80 | Min. 30 deg. Req'd for Quality Movement | | |
| Angle Solver | Solve | | | | | | |

| Rocker Angle (Input) | Crank Angle (Output) | Formula |
|---|---|---|
| 148 | 214.4612 | 0.99973941 |
| 147 | 193.101 | 0.99939555 |
| 146 | 179.1493 | 0.99970592 |
| 145 | 167.502 | 0.99984411 |
| 144 | 157.0239 | 0.9999297 |
| 143 | 147.1744 | 0.99999703 |
| 142 | 137.6119 | 1.00006207 |
| 141 | 128.0603 | 1.00013753 |
| 140 | 118.232 | 1.00024018 |
| 139 | 107.7395 | 1.00040918 |
| 138 | 95.93437 | 1.00090609 |
| 137 | -3.5E+15 | #NUM! |
| 136 | -6E+14 | #NUM! |

| Angle Input | +.020 | +.010 | Original | -.010 | -.020 |
|---|---|---|---|---|---|
| 148 | 184.4918 | 190.7687 | 197.316028 | 204.9706 | 214.4612 |
| 147 | 171.8493 | 176.7662 | 181.93259 | 187.3301 | 193.101 |
| 146 | 160.8684 | 165.267 | 169.854994 | 174.3919 | 179.1493 |
| 145 | 150.7885 | 154.8974 | 159.081005 | 163.2454 | 167.502 |
| 144 | 141.1774 | 145.1311 | 148.989671 | 153.0468 | 157.0239 |
| 143 | 131.7322 | 135.632 | 139.495256 | 143.3471 | 147.1744 |
| 142 | 122.1817 | 126.127 | 129.969499 | 133.8354 | 137.6119 |
| 141 | 112.2122 | 116.3262 | 120.278018 | 124.2401 | 128.0603 |
| 140 | 101.3503 | 105.8272 | 109.939104 | 114.2579 | 118.232 |
| 139 | 88.62953 | 93.91801 | 98.6934627 | 103.4222 | 107.7395 |
| 138 | 69.57486 | 78.08667 | 84.9439679 | 90.48708 | 95.93437 |

ZERO/SPAN ADJUSTABLE LINKAGE MOVEMENT FOR MEASURING DEVICES

CROSS-REFERENCE TO RELATED APPLICATIONS

This application claims the benefit of U.S. Provisional Application No. 61/526,491 filed Aug. 23, 2011, all of which is herein incorporated by reference in its entirety.

BACKGROUND

1. Technical Field

The present disclosure relates to a measuring device assembly and method for fabricating measuring device assemblies and, more particularly, to measuring device assemblies having zero/span adjustable linkage movements (e.g., zero/span adjustable four-bar linkage movements).

2. Background Art

Measuring devices, such as instruments and gauges used for measuring temperature and pressure, have innumerable uses in industry. For example, pressure gauges to measure the pressure of process media are well known. Pressure gauges are useful in a myriad of different environments for commercial and industrial applications. Typically, pressure gauges measure pressure and provide an indication of the value. Pressure values are usually displayed in analog form (e.g., by a pointer) or in digital form (e.g., by an electronic readout).

Price competition between the various measuring device manufacturers is a factor in the marketplace. Therefore, a savings in the cost of material, labor and the like by a manufacturer can have a significant effect on that manufacturer's sales, market share and margins. Therefore, a constant need exists among these manufacturers to develop more cost effective manufacturing techniques.

In general, forms of measuring devices of the suspended movement type are disclosed, for example, in U.S. Pat. Nos. 4,055,085; 4,237,738; 4,246,796; 4,444,057 and 6,295,876, each incorporated herein by reference in their entireties. For example, U.S. Pat. No. 4,055,085 (the "'085 patent") discloses a pressure gauge or the like in which the amplifier movement is supported on the free end of a condition responsive element (e.g., a Bourdon tube or the like) for floating conjointly with displacement of the element end. An actuator extends into the motion path of the floating amplifier to define a pivot axis for a hinged gear sector arm of the amplifier. In pivoting about the actuator axis, the sector arm operably drives a rotatable output shaft supporting a pointer or indicator or the like opposite a graduated dial face.

The '085 patent also discloses designs for suspended movement measuring devices having span adjustment. In general, span adjustment is for effecting pointer or indicator travel coincident with the dial span encountered by the measuring device on being subject to a full range of condition changes (e.g., pressures) through which it is intended to operate. Typically, this span adjustment system/method utilizes a square socket with a tapered screw, and the suspended movement measuring device may be calibrated with the dial in place. However, this span adjustment system/method adds costly machining operations to the socket and/or to the measuring device (e.g., mounting features for the dial, a threaded hole for a tapered screw, alignment/mounting groove for an actuator). In addition, this system/method is typically only used on brass systems due to the complexity of the parts, as stainless steel parts, for example, would generally be too expensive to utilize in a similar or like design.

Another existing system/method for suspended movement measuring devices having span adjustment typically includes a wire and block assembly. In general, this assembly is difficult to adjust, and is typically susceptible to shifts in shock, due to the construction of the assembly, for example. In addition, generally the dial of the measuring device must be removed in order to calibrate the measuring device, which typically makes calibration difficult. For example, with no dial, an operator cannot see the measurement tick marks. In general, this span adjustment system/method for suspended movement measuring devices cannot be automated.

Another existing system/method for suspended movement measuring devices having span adjustment is disclosed and described in U.S. Pat. No. 7,503,222, the entire contents of which is herein incorporated by reference. However, suspended movement measuring devices and/or measuring devices that utilize gear movements or the like generally require a large number of components, and are not rugged under certain shock and/or vibration conditions. In general, measuring devices having a linkage movement are more durable under such conditions.

One example of a measuring device having a linkage movement is disclosed and described in U.S. Pat. No. 5,349,866, the entire contents of which is herein incorporated by reference. However, such existing measuring devices that utilize linkage mechanisms to amplify angular movement accomplish span adjustment in such a way that it also affects the linearity of the measuring devices (e.g., the linear relationship between input and output angles).

Thus, despite efforts to date, a need remains for cost effective and efficient systems/methods that provide for measuring device assemblies having zero/span adjustable linkage movements (e.g., zero/span adjustable four-bar linkage movements). In addition, a need remains for systems/methods that provide for measuring device assemblies having zero/span adjustable linkage movements where the zero/span adjustable linkage movements do not adversely affect linearity of the measuring device assemblies, and where the measuring device assemblies are rugged and able to withstand certain extreme shock and/or vibration conditions.

These and other inefficiencies and opportunities for improvement are addressed and/or overcome by the systems and methods of the present disclosure.

SUMMARY

The present disclosure provides an advantageous measuring device assembly and method for fabricating advantageous measuring device assemblies. In exemplary, embodiments, the present disclosure provides for improved systems and methods for fabricating measuring device assemblies (e.g., a pressure gauge, thermometer or the like) having zero/span adjustable linkage movements (e.g., zero/span adjustable four-bar linkage movements). In exemplary embodiments, the present disclosure provides for systems and methods for fabricating measuring device assemblies having zero/span adjustable linkage movements where the zero/span adjustable linkage movements do not adversely affect linearity of the measuring device assemblies, and where the measuring device assemblies are rugged and able to withstand certain extreme shock and/or vibration conditions.

In one embodiment, the measuring device assemblies of the present disclosure will operate with any reading/measuring device that involves an amplification of angular movement, where the amplified angular movement is below about 180°. As noted above, the exemplary measuring device assemblies of the present disclosure allow the span to be adjusted without substantially affecting linearity of the measuring device assemblies. Additionally, the adjustable linkage movements (e.g., adjustable four-bar linkage movements) of the exemplary measuring device assemblies of the present disclosure are much more durable under extreme shock and/or vibration conditions as compared to existing measuring devices (e.g., suspended movement measuring devices or the like). In exemplary embodiments, the measuring device assemblies of the present disclosure are also able to withstand high temperature extremes, and meet significant environmental requirements for water ingress protection. The measuring devices of the present disclosure address the aspects of manufacturability which require, inter alia, ease of calibration and the setting of zero and span.

The present disclosure provides for a measuring device assembly including a bracket member; a condition responsive element mounted with respect to the bracket member, the condition responsive element including an element inlet and an output end configured to produce motion in response to condition changes: (i) received at the element inlet and (ii) to which the condition responsive element is sensitive; a coupler member having a first end and a second end, the first end mounted with respect to the output end of the condition responsive element via a pin member and the second end mounted with respect to a crank pin of a crank assembly, the coupler member configured and dimensioned to communicate correlated but amplified angular motion of the condition responsive element to a rotatable crank body of the crank assembly for operating an indicator relative to condition changes on a dial face; wherein at least a portion of the crank pin defines a first longitudinal axis and at least a portion of the crank body defines a second longitudinal axis; and wherein the span or degrees of indicator rotation may be adjusted by changing the distance between the first longitudinal axis and the second longitudinal axis.

The present disclosure also provides for a measuring device assembly wherein the bracket member is mounted with respect to a housing or a case. The present disclosure also provides for a measuring device assembly wherein the condition responsive element is a helical coil or a Bourdon tube. The present disclosure also provides for a measuring device assembly wherein the condition changes are pressure or temperature changes. The present disclosure also provides for a measuring device assembly wherein the element inlet is mounted with respect to a pressure fitting.

The present disclosure also provides for a measuring device assembly wherein the crank pin is mounted with respect to the crank body by inserting a first end of the crank pin through an aperture or opening of the crank body. The present disclosure also provides for a measuring device assembly wherein the first longitudinal axis and the second longitudinal axis are substantially parallel to one another.

The present disclosure also provides for a measuring device assembly further including a distance gauge member that is configured and dimensioned to allow a user to adjust the span or degrees of indicator rotation by changing the distance between the first longitudinal axis and the second longitudinal axis. The present disclosure also provides for a measuring device assembly wherein the distance gauge member includes a plurality of outer apertures, with each outer aperture configured and dimensioned to allow at least a portion of the crank pin to be inserted therein or therethrough; wherein the distance gauge member includes an inner aperture, with the inner aperture configured and dimensioned to allow at least a portion of the crank body to be inserted therein or therethrough; and wherein each outer aperture is positioned or located on the distance gauge member a different distance from the inner aperture.

The present disclosure also provides for a method for fabricating a measuring device assembly including providing a bracket member; providing a condition responsive element; mounting the condition responsive element with respect to the bracket member, the condition responsive element including an element inlet and an output end configured to produce motion in response to condition changes: (i) received at the element inlet and (ii) to which the condition responsive element is sensitive; providing a coupler member having a first end and a second end; mounting the first end of the coupler member with respect to the output end of the condition responsive element via a pin member; mounting the second end of the coupler member with respect to a crank pin of a crank assembly, the coupler member configured and dimensioned to communicate correlated but amplified angular motion of the condition responsive element to a rotatable crank body of the crank assembly for operating an indicator relative to condition changes on a dial face; wherein at least a portion of the crank pin defines a first longitudinal axis and at least a portion of the crank body defines a second longitudinal axis; and wherein the span or degrees of indicator rotation may be adjusted by changing the distance between the first longitudinal axis and the second longitudinal axis.

Additional advantageous features, functions and applications of the disclosed systems, assemblies and methods of the present disclosure will be apparent from the description which follows, particularly when read in conjunction with the appended figures.

BRIEF DESCRIPTION OF THE DRAWINGS

Exemplary embodiments of the present disclosure are further described with reference to the appended figures. It is to be noted that the various features and combinations of features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein:

FIGS. 1-3 are partial rear views of a measuring, device according to an exemplary embodiment of the present disclosure;

FIGS. 13A-13E are partial top views of measuring device sub-assemblies according to other exemplary embodiments of the present disclosure;

DETAILED DESCRIPTION

Figure 4:
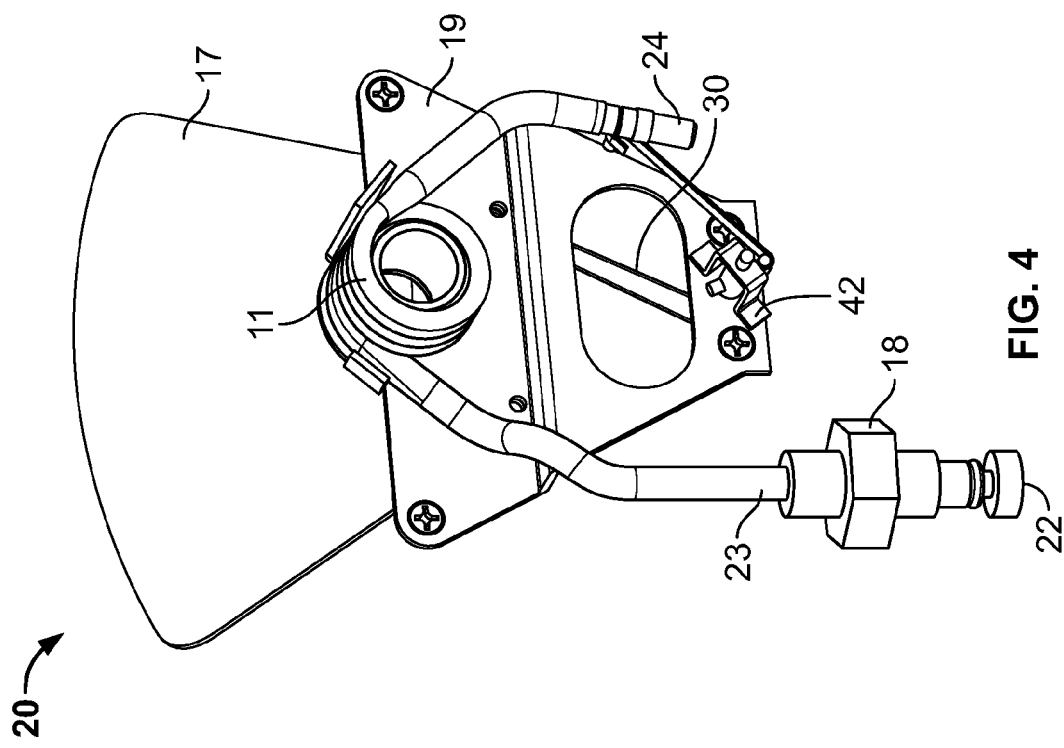
FIGS. 4-6 are rear perspective views of a measuring device sub-assembly according to an exemplary embodiment of the present disclosure.

In the description which follows, like parts are marked throughout the specification and drawings with the same reference numerals, respectively. Drawing figures are not necessarily to scale and in certain views, parts may have been exaggerated for purposes of clarity.

The present disclosure provides for systems and methods for fabricating measuring devices, e.g., a pressure gauge, thermometer or the like. More particularly, the present disclosure provides for improved systems and methods for fabricating measuring device assemblies having zero/span adjustable linkage movements (e.g., zero/span adjustable four-bar linkage movements). In an exemplary embodiment, the present disclosure provides for measuring device assemblies having zero/span adjustable linkage movements where the zero/span adjustable linkage movements do not adversely affect linearity of the measuring device assemblies, and where the measuring device assemblies are rugged and able to withstand certain extreme shock and/or vibration conditions.

Current practice provides that typical suspended movement measuring devices and/or measuring devices that utilize gear movements or the like generally require a large number of components, and are not rugged under certain (e.g., extreme) shock and/or vibration conditions. Current practice also provides that typical measuring devices that utilize linkage mechanisms to amplify angular movement accomplish span adjustment in such a way that it also adversely affects the linearity of the measuring devices (e.g., the linear relationship between input and output angles).

In general, the present disclosure provides for improved systems/methods for fabricating measuring device assemblies having zero/span adjustable linkage movements wherein the zero/span adjustable linkage movements do not adversely affect linearity of the measuring device assemblies, reduce/simplify the number of components required (e.g., compared to measuring devices that utilize gear and pinion to amplify angular motion), and wherein the measuring device assemblies are rugged and able to withstand certain extreme shock and/or vibration conditions, thereby providing a significant manufacturing and commercial advantage as a result.

In exemplary embodiments of the present disclosure, the measuring device assemblies utilize crank-and-rocker mechanisms of a four-bar linkage such that angular motion applied to the rocker is amplified at the crank. Span can be adjusted by changing the length of the crank arm without substantially affecting linearity. Offset can be adjusted by changing the angle at which the pointer/indicator is attached to the crank body, and/or by changing the length of the coupler. The present disclosure also addresses a number of different approaches to making these adjustments.

Figure 3:
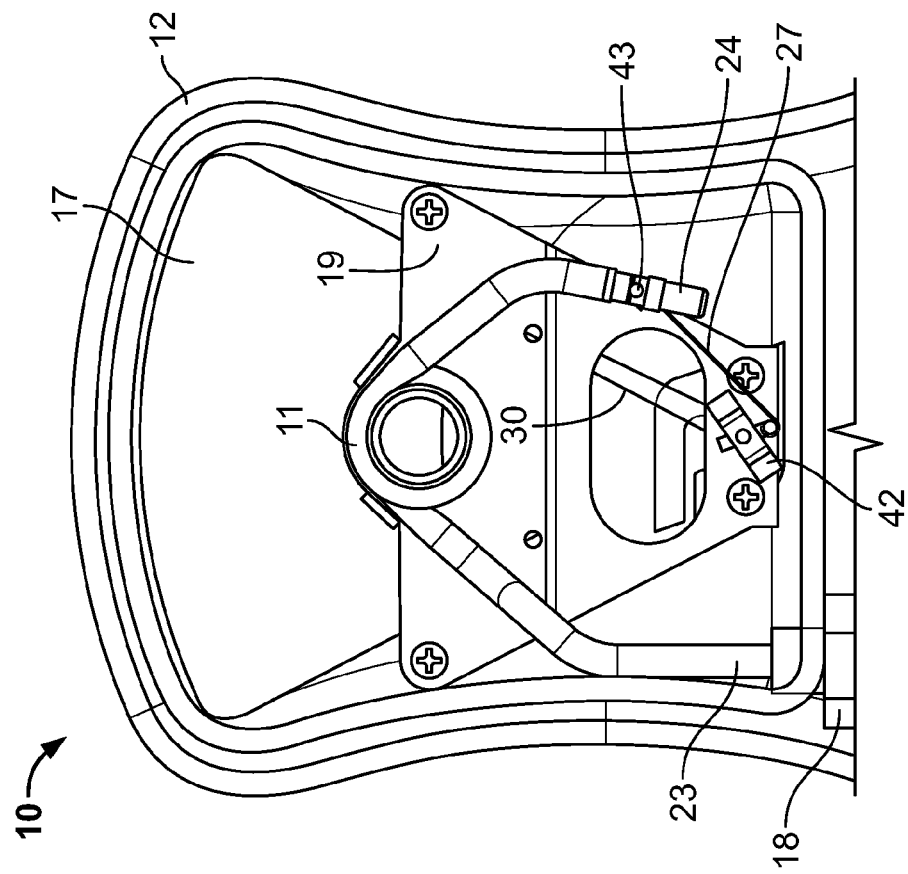

Referring now to the drawings, and in particular to FIGS. 1-3, there is illustrated a partial view of a measuring device 10 depicting an embodiment of the present disclosure. For example, measuring device 10 may be a pressure measuring device, including, but not limited to, a pressure gauge, a pressure transducer or the like. In another embodiment, measuring device 10 is a temperature measuring device. However, pressure or temperature measuring devices are not the only measuring devices that could be used in accordance with the principles of the present disclosure, as will be readily apparent to persons skilled in the art from the description provided herein.

For example, measuring device 10 may be coupled or mounted with respect to a container such as a tank, a pipe, a pressurized reactor or the like from which (or for which) measurements are to be obtained. The measuring device 10 allows a condition to be measured, whether it be pressure, temperature or some other value, to be measured by a condition responsive element or measuring device mechanism 11, such as, for example, a helical coil, or a Bourdon tube or the like. In exemplary embodiments and as shown in FIGS. 1-3, an indicator or pointer 30 is mounted on and/or with respect to the measuring device 10 (e.g., staked onto a tip of the crank body, as discussed further below), typically for rotation about an axis of the measuring device 10 to an angular position representative of the value measured by the measuring device 10, whether it be pressure, temperature or some other condition.

In one embodiment, measuring device 10 includes a housing or case 12, with the measuring device sub-assembly 20 (FIGS. 4-7) typically mounted with respect to the housing 12 via bracket 19. In general, housing or case 12 is configured and dimensioned to house and/or protect the measuring device mechanism or condition responsive element 11 of measuring device 10. In one embodiment, element 11 (e.g., a helical coil or the like) is positioned and/or housed on mounting member 13 (e.g., substantially cylindrical mounting member) of bracket 19. Bracket 19 may also include at least one positioning member 34 for element 11. However, it is noted that bracket 19 may not include a positioning member 34.

Exemplary housing or case 12 takes the form of a substantially rectangular housing, although the present disclosure is not limited thereto. Rather, housing or case 12 can take a variety of forms. For example, case 12 may be substantially cylindrical, with case 12 interfitting with a socket having a threaded stem for mounting the measuring device 10 into a threaded aperture from which measurements are to be obtained. Housing or case 12 may also include a window or the like. Measuring device 10 typically includes a dial face 17 having graduations or measurement tick marks (not shown).

With reference to FIGS. 4-7, there is illustrated a measuring device sub-assembly 20 according to an exemplary embodiment of the present disclosure. In general, sub-assembly 20 may be assembled for use in measuring device 10 (e.g., mounted with respect to housing or case 12).

As noted above, sub-assembly 20 typically includes a condition responsive element 11 that is configured to produce motion in response to condition changes to which the condition responsive element 11 is sensitive. In one embodiment and as shown in FIGS. 2-4, sub-assembly 20 for use in a measuring device 10 (e.g., a pressure gauge) includes a condition responsive element 11 (e.g., a helical coil or the like) having an output end 24 adapted or configured for displacement in correlation to the value of conditions (e.g., pressures) received at element inlet 23. Sub-assembly 20 may be configured and dimensioned for installation in a housing or case 12 of measuring device 10, with element inlet 23 providing an appropriate inlet connection. Typically, element inlet 23 is connected or mounted with respect to an appropriate condition source opening. In one embodiment, element inlet 23 is connected or mounted with respect to pressure fitting or socket 18. In an exemplary embodiment, the condition to be measured (e.g., fluid pressure) is received at pressure fitting inlet 22 and is communicated to condition responsive element 11 having an output end 24 that is subject to arcuate or angular motion displacement (e.g., relative to a non-moving portion, point and/or axis of element 11) in a well known manner in response to incremental condition changes (e.g., pressure changes) received at pressure fitting inlet 22.

The motion of output end 24 is conducted to a crank assembly 26 via a coupler member 27 to produce correlated but amplified motion for operating an indicator 30 relative to condition values (e.g., pressure values) on dial face 17. Crank assembly 26 typically includes a crank body 28 and a crank pin 29. Indicator 30 is typically mounted with respect to crank body 28 (e.g., staked or attached onto a tip of the crank body 28).

Figure 7:
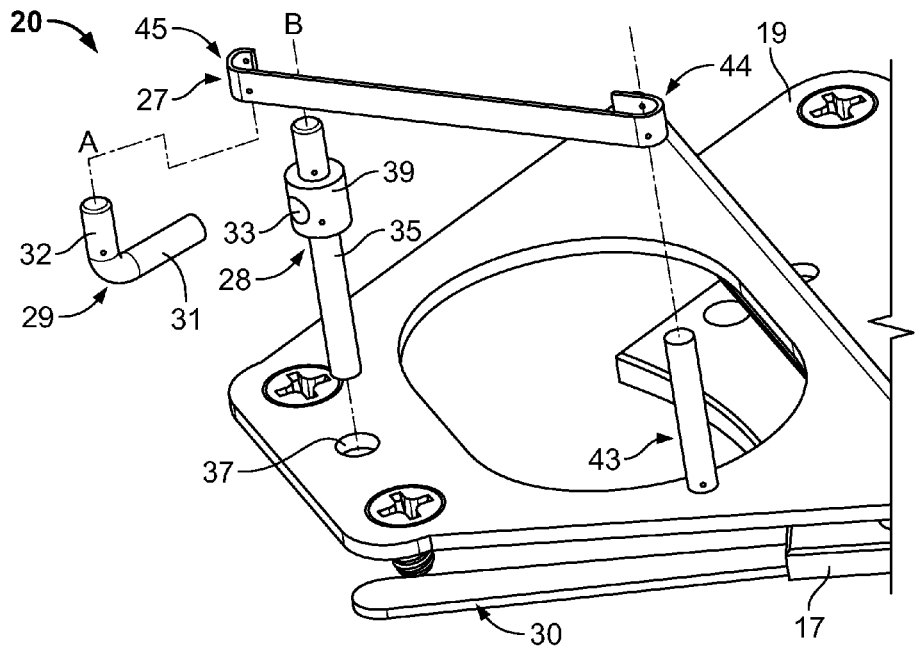
FIG. 7 is a partial top perspective view of the measuring device sub-assembly of FIGS. 4-6.

In an exemplary embodiment, arcuate displacement of the indicator 30 by operation or rotation of crank body 28 reflects values of the condition measured (e.g., pressure) as represented by graduations or measurement tick marks on dial face 17. Crank pin 29 is typically secured or mounted with respect to crank body 28 by inserting a first end 31 of crank pin 29 through an aperture or opening 33 of crank body 28 (FIG. 7). In general, crank body 28 is mounted with respect to (e.g., rotatably mounted with respect to) bracket 19 by inserting a first end 35 of crank body through an aperture 37 of bracket 19. Indicator 30 is typically mounted with respect to first end 35 of crank body 28. Bulge or protrusion 39 of crank body 28, along with mounting bracket 42, typically rotatably secures/mounts crank body 28 to bracket 19. Mounting bracket 42 is typically secured or mounted with respect to bracket 19 via various fastening/securement means (e.g., via soldering, welding, brazing or the like). In general, mounting bracket 42 includes an opening or aperture 48 that allows at least a portion of crank body 28 to be inserted therein and/or therethrough.

Figure 5:
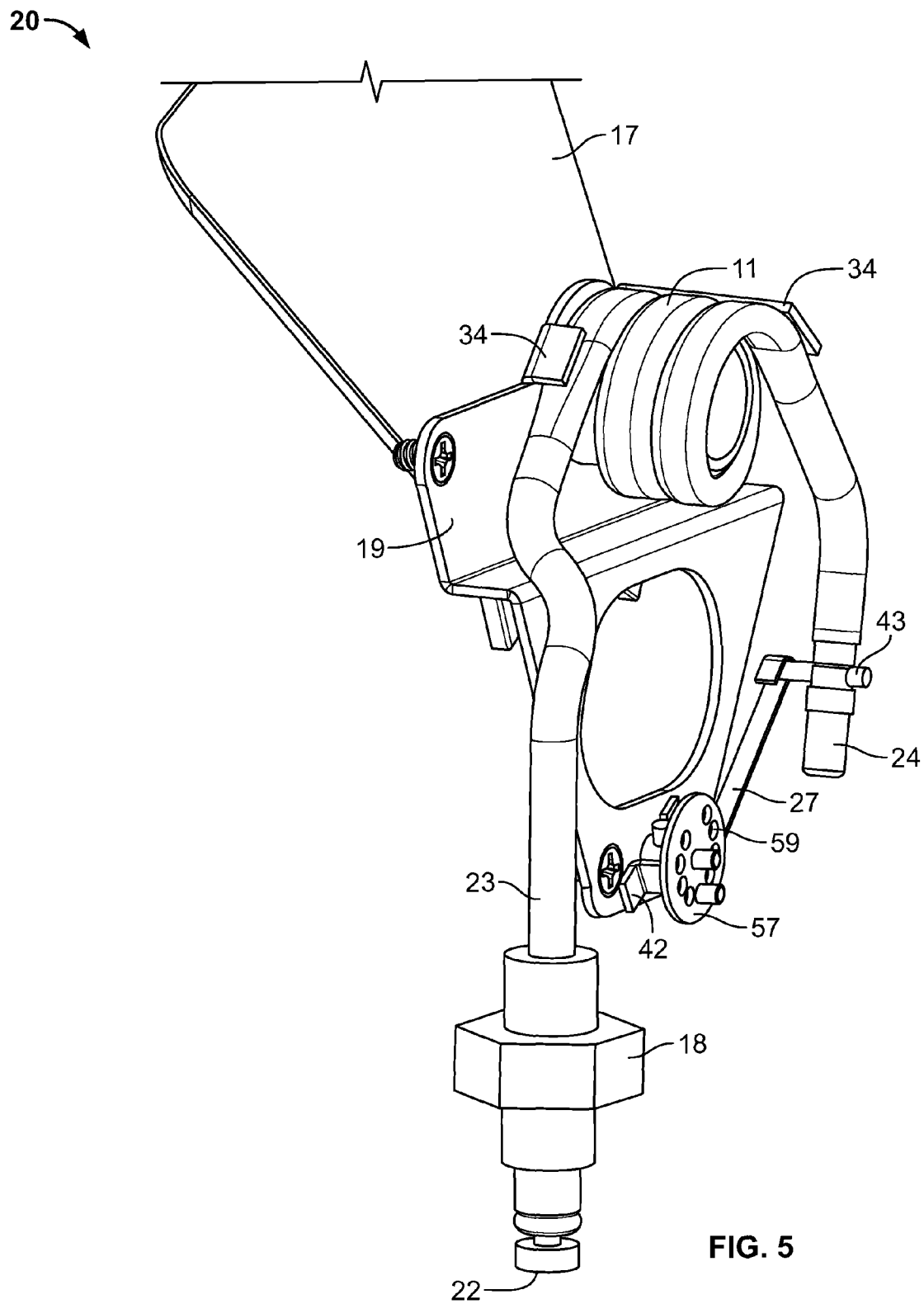
Figure 6:
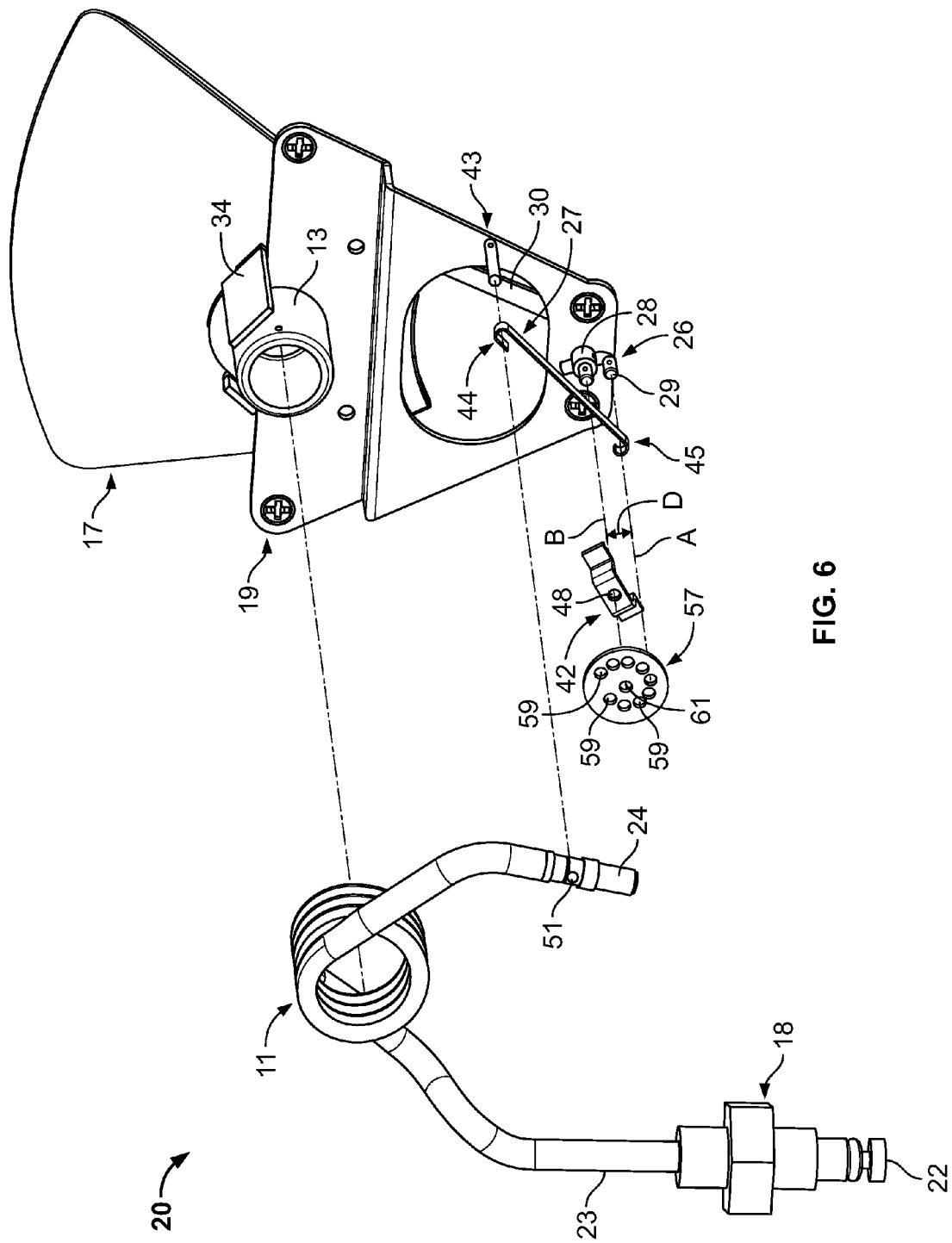
Figure 8:
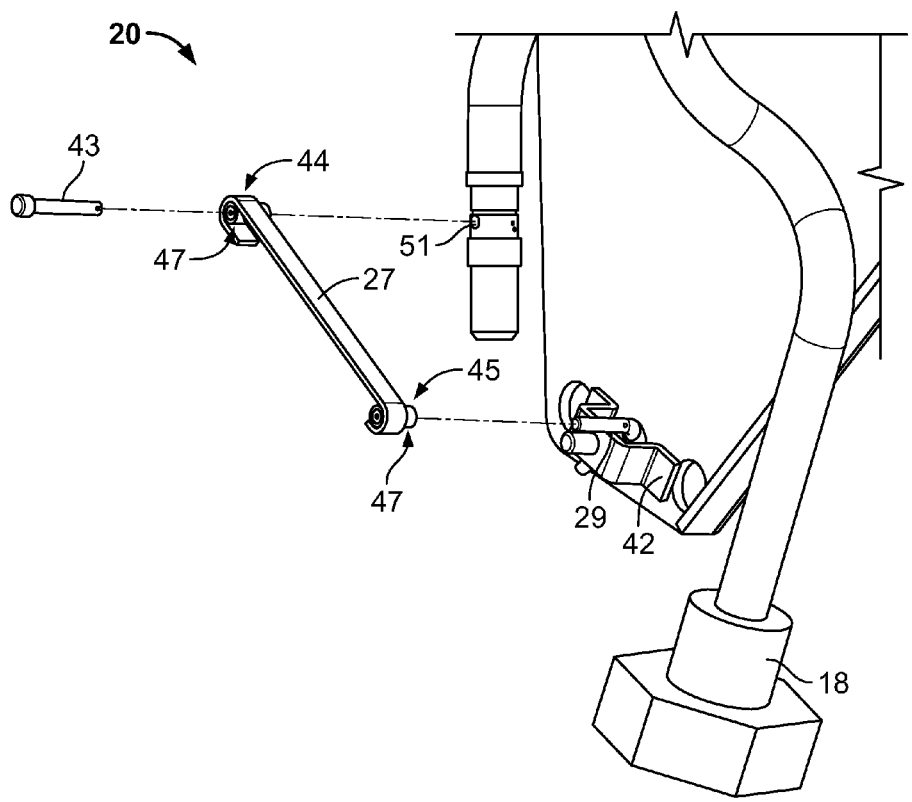
FIG. 8 is a partial front perspective view of a measuring device sub-assembly according to another exemplary embodiment of the present disclosure.

In general, device 10 typically includes pin or rod 43. In exemplary embodiments, a first end 44 of coupler member 27 is secured or mounted with respect to pin 43, and a second end 45 of coupler member 27 is secured or mounted with respect to crank pin 29. As shown in FIG. 8, sleeves 47 or the like may be secured (e.g., soldered) to each end 44, 45 of coupler member 27. For example, one sleeve 47 facilitates first end 44 of coupler member 27 being secured or mounted with respect to pin 43, and the other sleeve 47 facilitates second end 45 of coupler member 27 being secured or mounted with respect to crank pin 29. As best shown in FIGS. 5-6, pin 43 is also secured or mounted with respect to output end 24 of condition responsive element 11. For example, pin 43 may be inserted through an aperture 51 of output end 24, and then fastened/secured and/or mounted with respect to output end 24 via various fastening/securement means (e.g., via soldering, welding, brazing or the like).

In general, coupler member 27 can be rigid (e.g., fabricated from metal, metal beam/bar, steel bar, brass bar, etc.), or coupler member 27 can be non-rigid (e.g., fabricated from a flexible or flexing material such as, for example, sheet metal or the like). In exemplary embodiments, one or both ends 44, 45 of coupler member 27 include pin connections (e.g., via sleeves 47) that allow for relative rotation with respect to the output end 24 of element 11 (e.g., via pin 43), and/or with respect to the crank pin 29. Alternatively, one or both ends 44, 45 of coupler member 27 include rigid connections with respect to pin 43 and/or crank pin 29 (e.g., via soldering, brazing, welding, etc.).

It is noted that even though such pin connections or the like can be made small, such pin connections sometimes result in a slack between the two connected parts (e.g., because of the clearance that exists between the hole of the sleeve 47 and pin 43 or pin 29). This slack sometimes results in deadband, or a loss of motion sensitivity. Therefore, one can use a rigid connection instead of a pin connection or the like to substantially eliminate the source of slack, and rotation may be absorbed by the flexing of the coupler member 27. In addition, this tends to simplify the overall assembly of device 10/sub-assembly 20, and a cost reduction may also be achieved.

Figure 20:
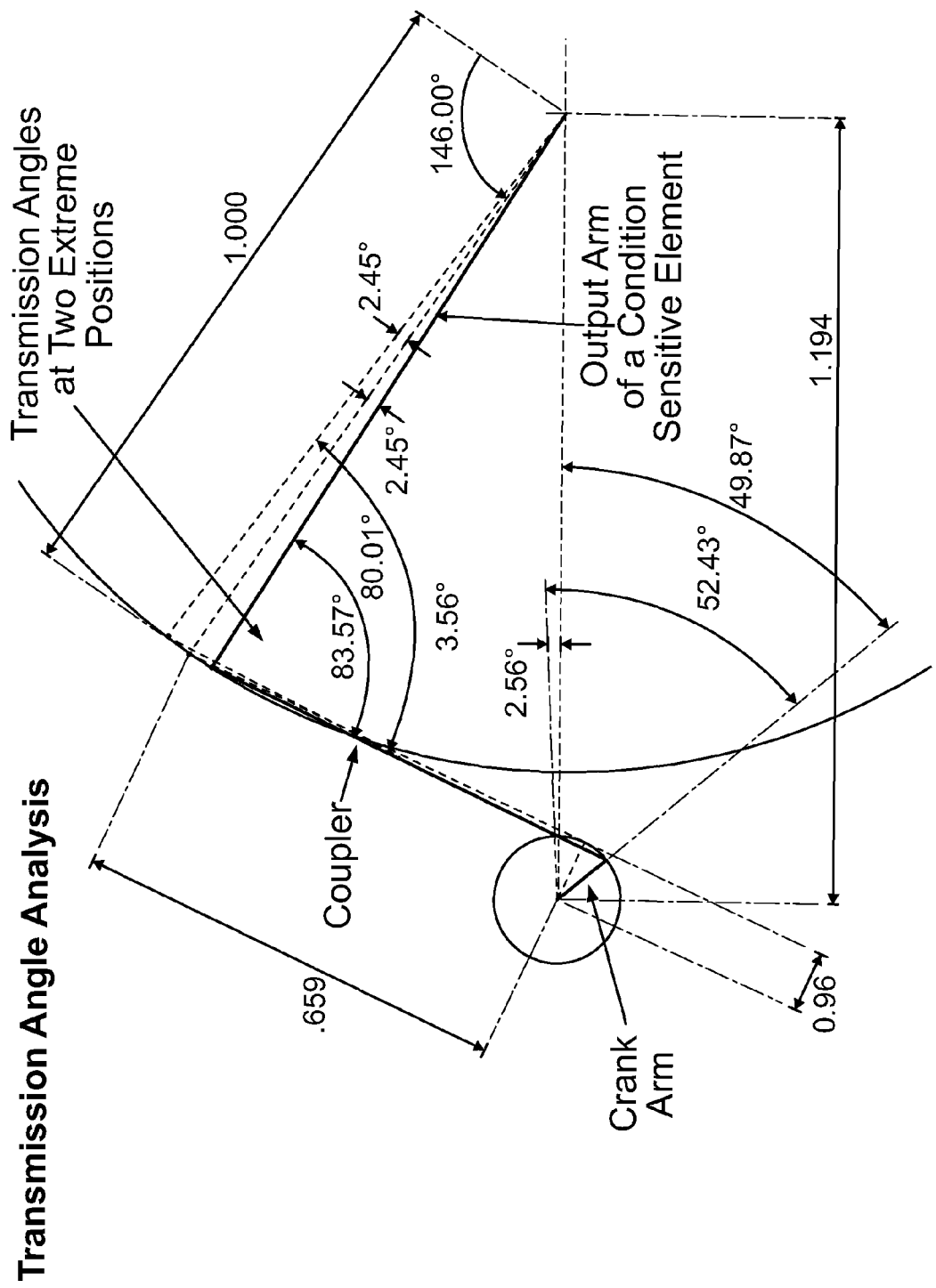
FIG. 20 depicts a transmission angle analysis of an exemplary measuring device or measuring device sub-assembly of the present disclosure.

One restriction to using a flexing or flexible coupler member 27 is that the change in angle between parts has to be small during operation. For example, the change in the angle between the coupler member 27 and the output end 24 of element 11 is typically quite small (e.g., less than 4° when applied pressure goes from zero to fullscale, as shown in FIG. 20), so it is small enough to be absorbed by the flexing of the coupler member 27. As such, a rigid connection between pin 43 and coupler member 27 is typically maintained at end 44 (e.g., via soldering, brazing, welding, etc.). The other end 45 of coupler member 27 has a much larger change in angle (FIG. 20), so a pin connection (e.g., via sleeve 47 and crank pin 29) typically is maintained at this end 45. It is noted that one needs to typically ensure that the coupler member 27 can flex in response to the rotation of its tip, but not stretch, as stretching will typically adversely increase the slack one is trying to minimize in the first place.

In exemplary embodiments, at least a portion of crank pin 29 defines a first longitudinal axis A, and at least a portion of crank body 28 defines a second longitudinal axis B. In one embodiment, axis A is substantially parallel to axis B, although the present disclosure is not limited thereto. In general, the span (e.g., degrees of indicator 30 rotation) of the sub-assembly 20 and/or of the measuring device 10 may be adjusted by changing the distance D (FIG. 6) between the axis A of crank pin 29 and the axis B of crank body 28. In other words, the span of device 10/sub-assembly 20 may be adjusted by changing the distance between the crank pin 29 and the crank body 28. In one embodiment, once the span of the device 10/sub-assembly 20 has been adjusted to the desired level, crank pin 29 may be secured and/or mounted with respect to crank body 28 via various fastening/securement means (e.g., via soldering, welding, brazing or the like), although the present disclosure is not limited thereto.

In exemplary embodiments, the offset of device 10/sub-assembly 20 can be adjusted by changing the angle at which the pointer/indicator 30 is attached to the crank body 28. In another embodiment of the present disclosure, the offset of device 10/sub-assembly 20 can be adjusted by changing the length of coupler member 27.

In one embodiment of the present disclosure and as depicted in FIGS. 5-6, device 10/sub-assembly 20 may include a distance gauge disk or member 57. Exemplary distance gauge disk 57 takes the form of a substantially circular disk or member, although the present disclosure is not limited thereto. Rather, member 57 may take a variety of forms. In general, member 57 includes a plurality of outer openings or apertures 59, with each outer aperture 59 configured and dimensioned to allow at least a portion of crank pin 29 (e.g., second end 32 of crank pin 29) to be inserted therein and/or therethrough. Member 57 also typically includes an inner opening or aperture 61, with inner aperture 61 configured and dimensioned to allow at least a portion of crank body 28 to be inserted therein and/or therethrough.

In exemplary embodiments, each outer aperture 59 is positioned or located on member 57 a different distance from inner aperture 61. As such, after first end 31 of crank pin 29 has been inserted in aperture 33 of crank body 28, and after at least a portion of crank body 28 has been inserted in inner aperture 61 of member 57, a user may insert second end 32 of crank pin 29 in various outer apertures 59 to determine the desired span of device 10/sub-assembly 20. Once the desired span of the device 10/sub-assembly 20 has been adjusted to the desired level by utilizing member 57 and various apertures 59, the member 57 may be removed from the device 10/sub-assembly 20, and the crank pin 29 may be secured and/or mounted with respect to crank body 28 via various fastening/securement means, as discussed above. As such, the span of the device 10/sub-assembly 20 may be adjusted by utilizing member 57, which changes the distance D (FIG. 6) between the axis A of crank pin 29 and the axis B of crank body 28. In other words, the span of device 10/sub-assembly 20 may be adjusted by changing the distance between the crank pin 29 and the crank body 28 (e.g., via the differently spaced/positioned outer apertures 59 of member 57 from inner aperture 61).

Figure 9:
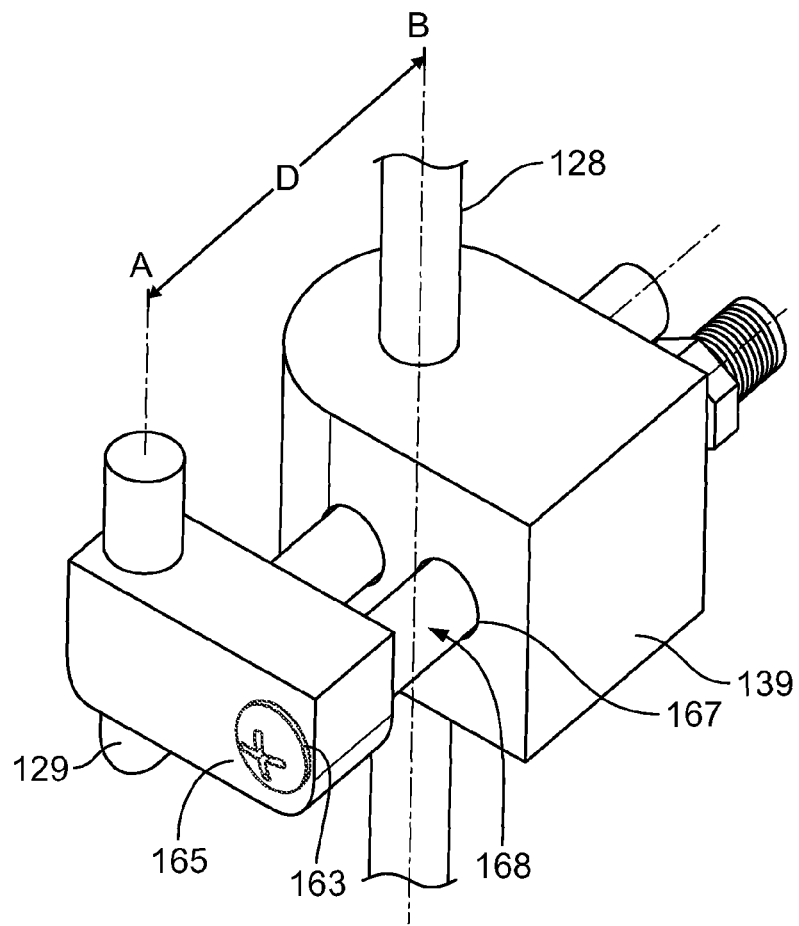
FIG. 9 is a partial top perspective view of a measuring device sub-assembly according to another exemplary embodiment of the present disclosure.

In another exemplary embodiment of the present disclosure and as depicted in FIG. 9, device 10/sub-assembly 20 may include a crank pin 129 and a crank body 128. Crank pin 129 and crank body 128 may be structurally and/or functionally similar to crank pin 29 and crank body 28 discussed above, with some differences. Unlike crank pin 29, crank pin 129 includes a bulge or extending section 165 having an aperture 163 therethrough. Similarly, bulge or extending section 139 of crank body 128 includes an aperture 167 therethrough. In general, aperture 163 is not threaded, while aperture 167 includes internal threads. A screw 168 or the like is positioned in and/or through apertures 163, 167. Screw 168 is typically at least partially threaded. A retaining ring (obscured) is typically positioned around the screw 168 on the backside of extending section 165, and a nut or the like (obscured) may be positioned around screw 168 on the backside of extending section 139. In general, the retaining ring rigidly connects the crank pin 129 to the screw 168, but allows the screw 168 to rotate. Rotation of screw 168 (e.g., clockwise or counter-clockwise) changes the distance D between the axis A of crank pin 129 and the axis B of crank body 128, thereby adjusting/changing the span of device 10/sub-assembly 20 having crank pin 129, crank body 128 and screw 168. In other words, the span of device 10/sub-assembly 20 may be adjusted by changing the distance between the crank pin 129 and the crank body 128 via screw 168.

Figure 10:
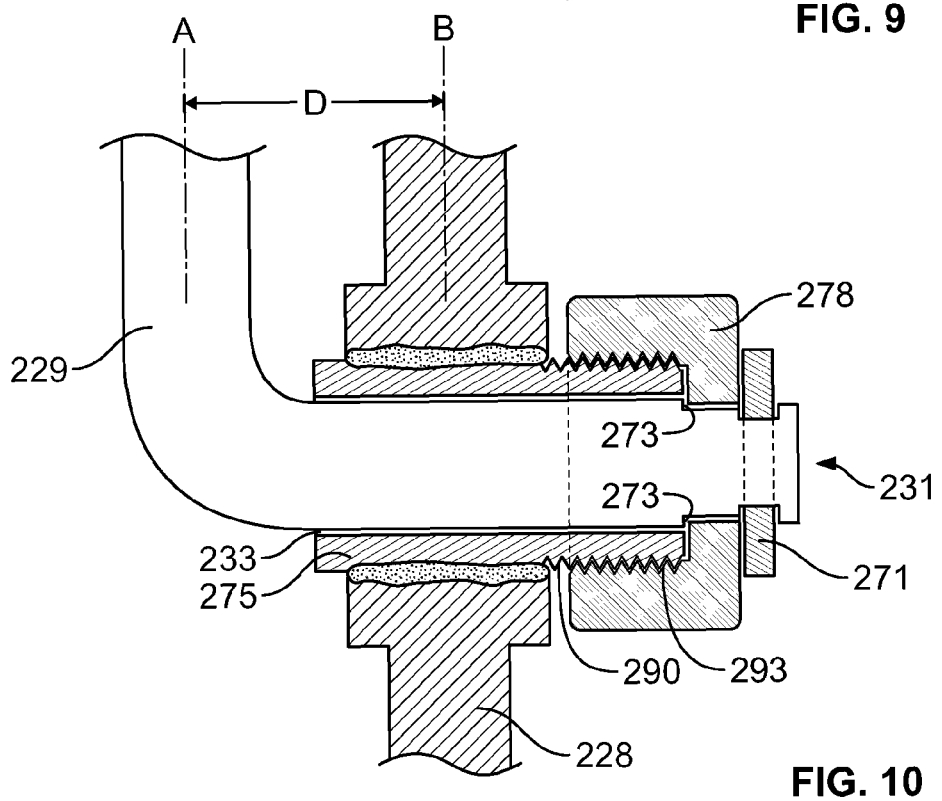
FIG. 10 is a partial side cross-sectional view of a measuring device sub-assembly according to another exemplary embodiment of the present disclosure.

In another exemplary embodiment of the present disclosure and as depicted in FIG. 10, device 10/sub-assembly 20 may include a crank pin 229 and a crank body 228. Crank pin 229 and crank body 228 may be structurally and/or functionally similar to crank pin 29 and crank body 28 discussed above, with some differences. Unlike crank pin 29, crank pin 229 includes a shoulder or step 273 at or near the first end 231 of crank pin 229. A retaining ring 271 is secured or mounted with respect to the first end 231 of crank pin 229. The aperture 233 of crank body 228 typically includes a cylindrical sleeve 275 disposed therein and therethrough. Sleeve 275 is typically disposed over at least a portion of crank pin 229 that is housed within aperture 233, and also is typically disposed over at least a portion of crank pin 229 that extends through aperture 233. Within aperture 233, sleeve 275 is secured or mounted with respect to the interior of aperture 233 via a variety of fastening means (e.g., brazing, soldering, welding, etc.). Outside of aperture 233, sleeve 275 typically includes external threads 290 that threadably engage with internal threads 293 of cap member 278. Cap member 278 is disposed over at least a portion of end 231 of crank pin 229 and is disposed over at least a portion of sleeve 275.

Rotation of cap member 278 (e.g., clockwise or counter-clockwise) changes the distance D between the axis A of crank pin 229 and the axis B of crank body 228, thereby adjusting/changing the span of device 10/sub-assembly 20 having crank pin 229, crank body 228 and cap member 278. In other words, the span of device 10/sub-assembly 20 may be adjusted by changing the distance between the crank pin 229 and the crank body 228 via cap member 278, with the cap member 278 moving (e.g., via translational motion) either the step 273 or the retaining ring 271 to move crank pin 229 along arrow D.

Figure 11:
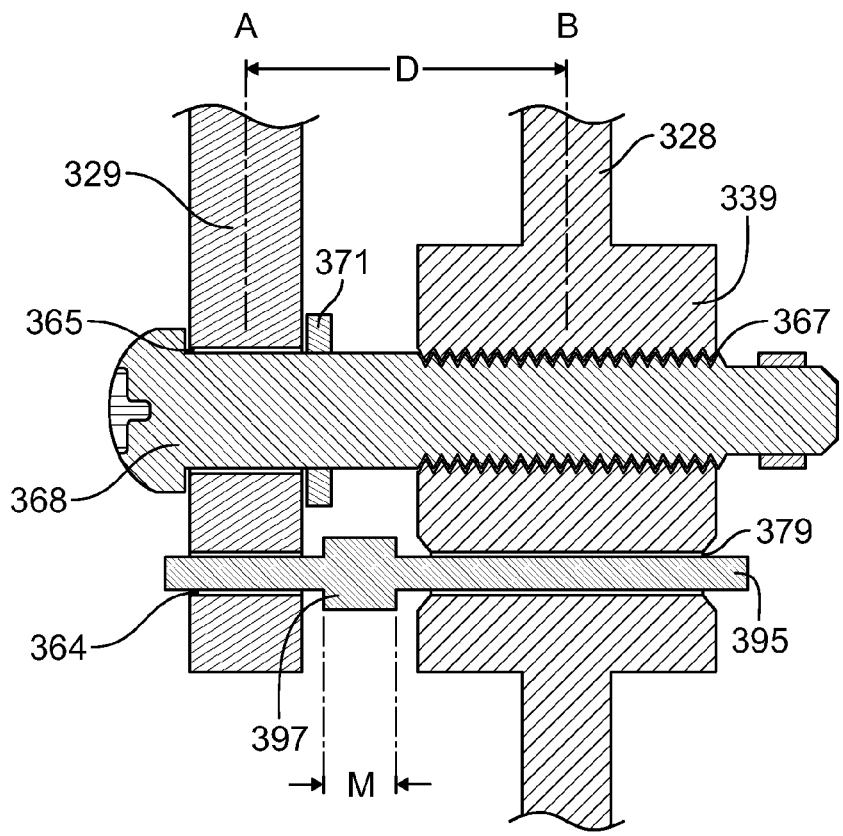
FIG. 11 is a partial side cross-sectional view of a measuring device sub-assembly according to another exemplary embodiment of the present disclosure.

In another exemplary embodiment of the present disclosure and as depicted in FIG. 11, device 10/sub-assembly 20 may include a crank pin 329 and a crank body 328. Crank pin 329 and crank body 328 may be structurally and/or functionally similar to crank pin 29 and crank body 28 discussed above, with some differences. Unlike crank pin 29, crank pin 329 includes a first aperture 365 and a second aperture 364 therethrough. Apertures 364, 365 are typically not threaded.

Bulge 339 of crank body 328 includes a first aperture 367 and second aperture 379 therethrough. Aperture 367 typically includes internal threads, while aperture 379 typically is not threaded.

An elongated member 395 or the like is positioned/disposed in and/or through apertures 364, 379. Elongated member 395 typically includes a bulge or protruding section 397 that acts as a positive or hard stop between crank pin 329 and crank body 328 to keep crank pin 329 and crank body 328 a minimum distance M from each other. Additionally, apertures 364, 379 and elongated member 395 serve to keep crank pin 329 and crank body 328 substantially parallel to one another (e.g., axis A substantially parallel to axis B).

A screw or bolt 368 or the like is positioned in and/or through apertures 365, 367. Screw 368 is typically at least partially threaded. A retaining ring 371 is typically positioned around the screw 368 on the backside of crank pin 329, and a nut or the like may be positioned around screw 368 on the backside of crank body 328. In general, the retaining ring 371 rigidly connects the crank pin 329 to the screw 368, but allows the screw 368 to rotate.

Rotation of screw 368 (e.g., clockwise or counter-clockwise) changes the distance D between the axis A of crank pin 329 and the axis B of crank body 328, thereby adjusting/changing the span of device 10/sub-assembly 20 having crank pin 329, crank body 328 and screw 368. In other words, the span of device 10/sub-assembly 20 may be adjusted by changing the distance between the crank pin 329 and the crank body 328 via screw 368.

Figure 12:
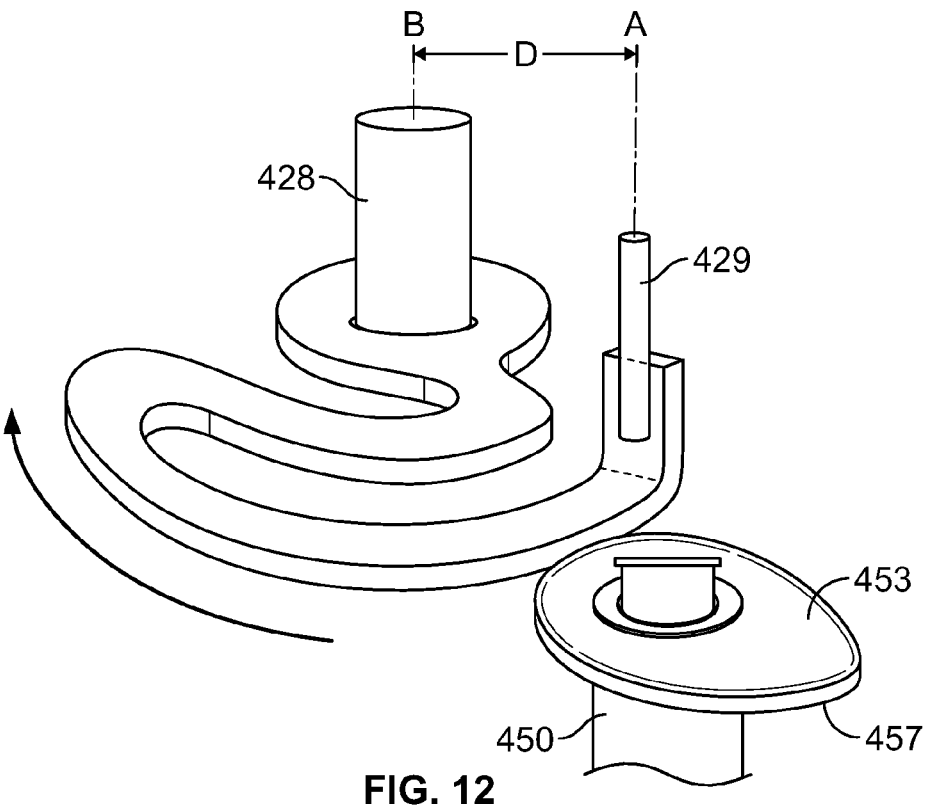
FIG. 12 is a partial side perspective view of a measuring device sub-assembly according to another exemplary embodiment of the present disclosure.
Figure 14B:
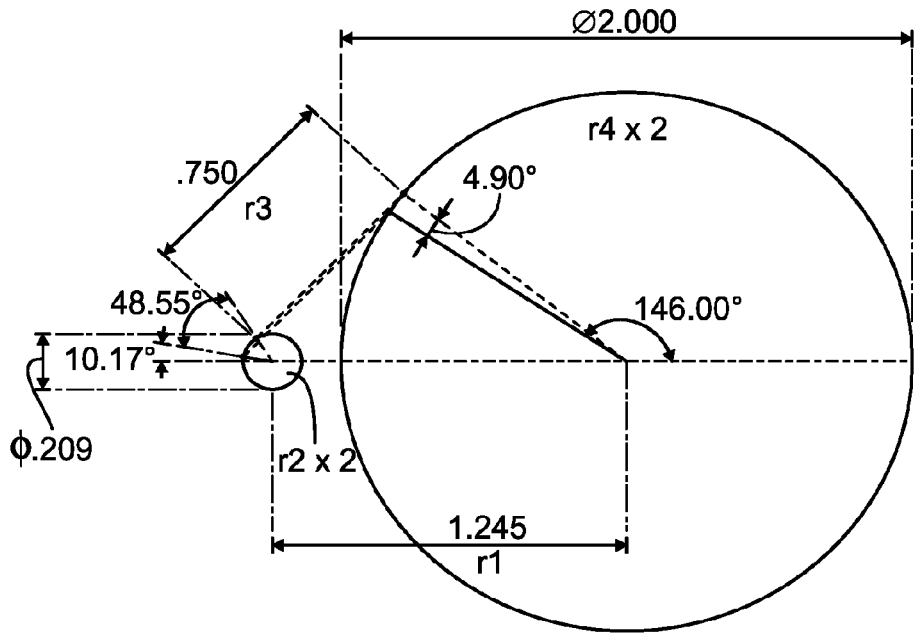
FIGS. 14-19 depict testing data, charts and tables that illustrate test results for various exemplary measuring devices and/or measuring device sub-assemblies of the present disclosure.
Figure 14C:
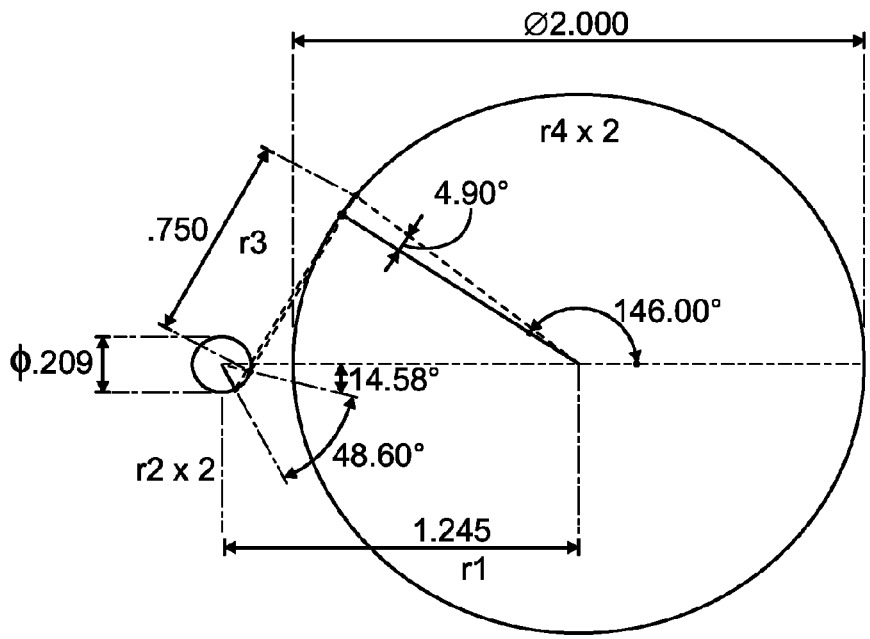
Figure 15:
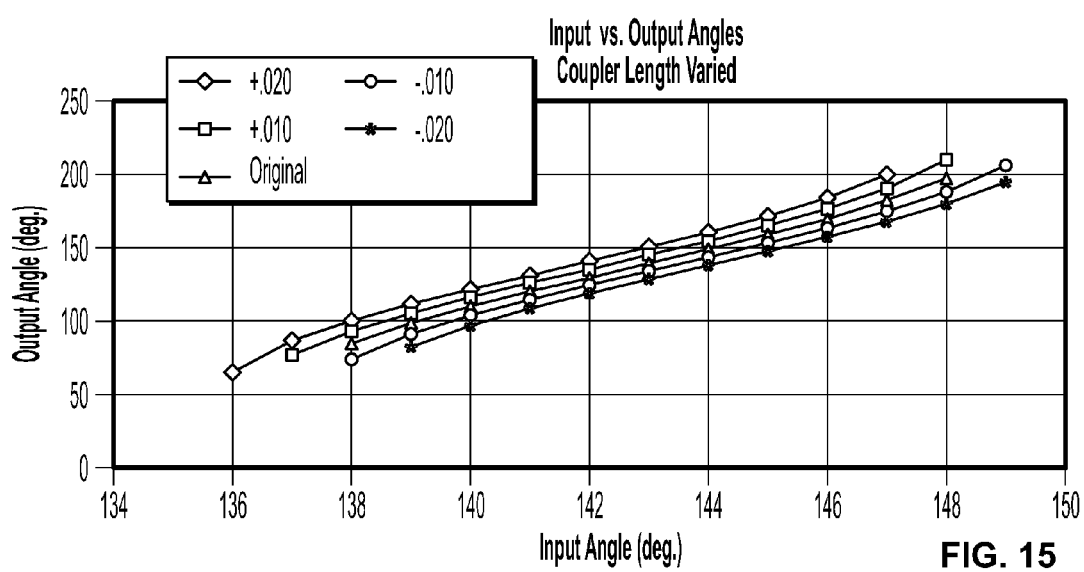
Figure 16:
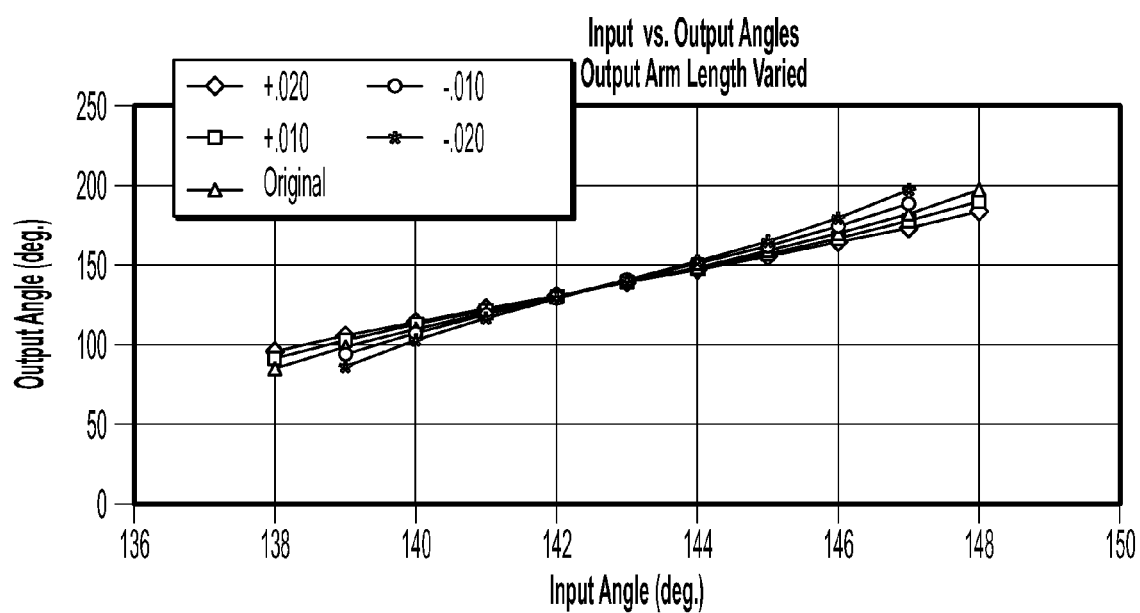
Figure 17:
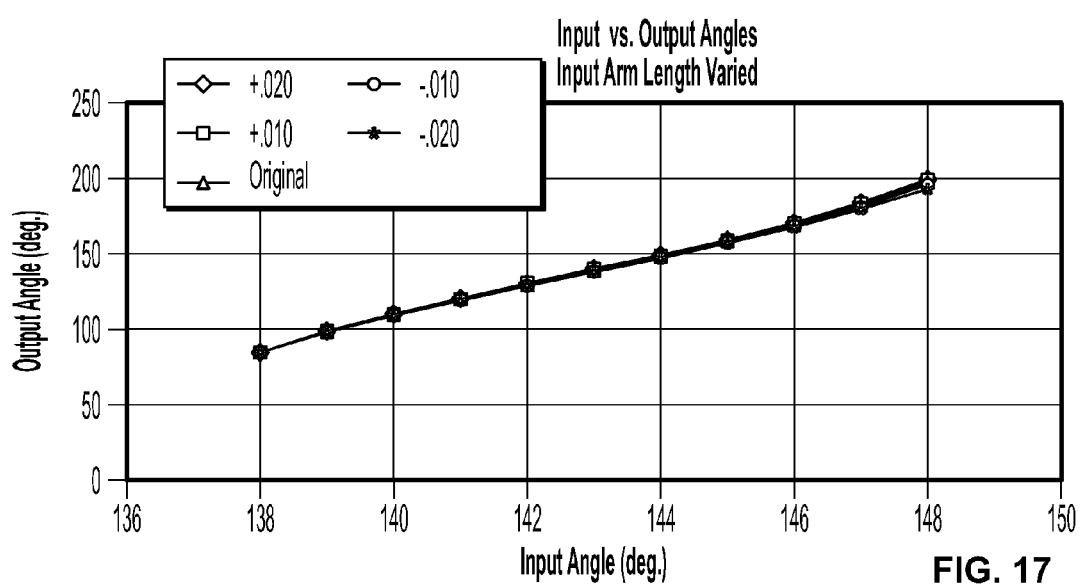
Figure 18:
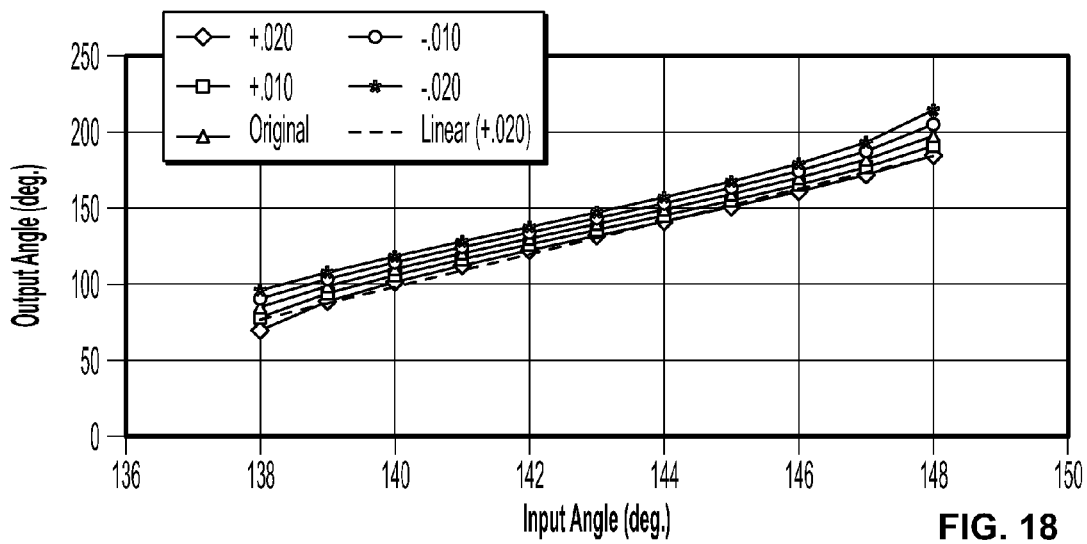
Figure 19A:
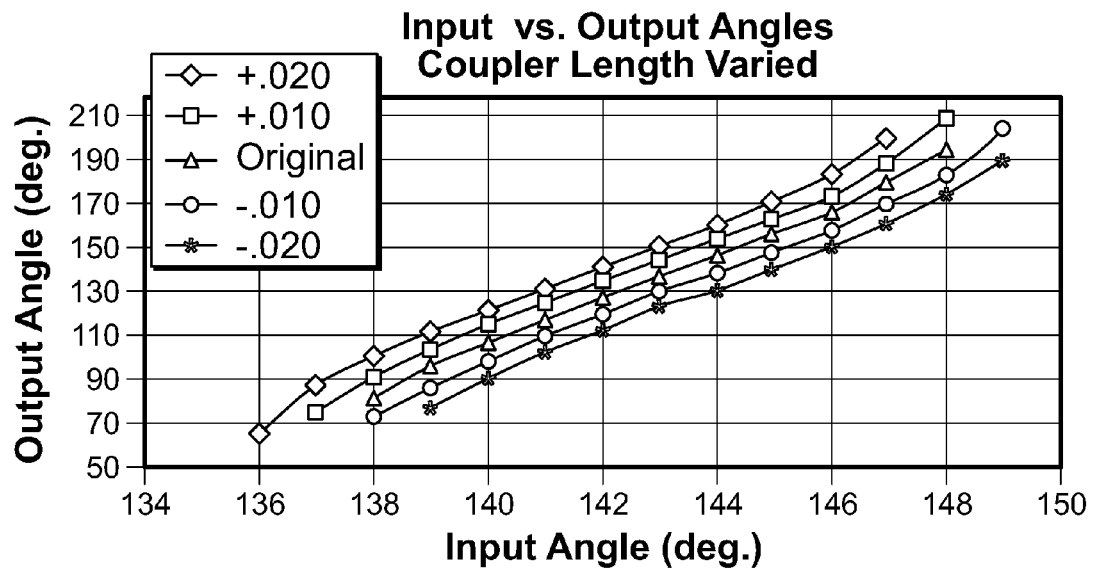
Figure 19B:
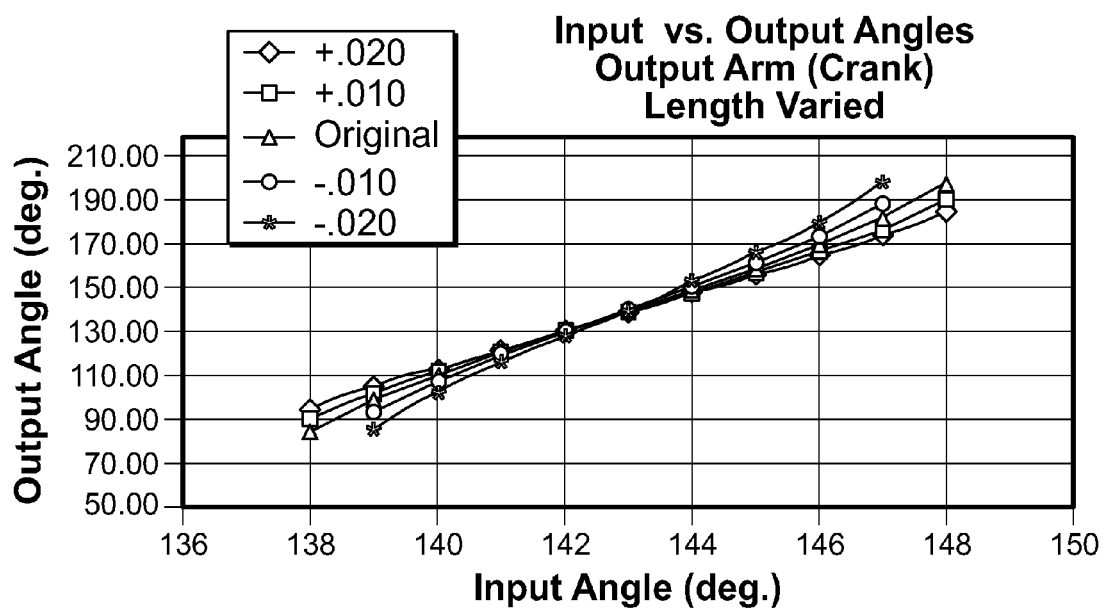
Figure 19C:
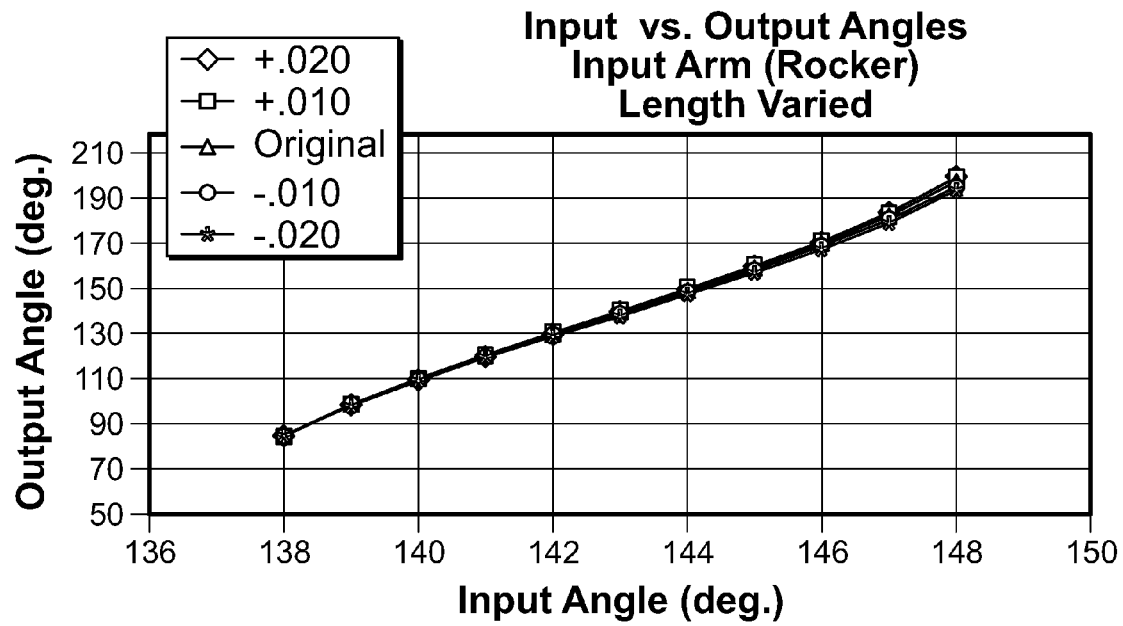
Figure 19D:
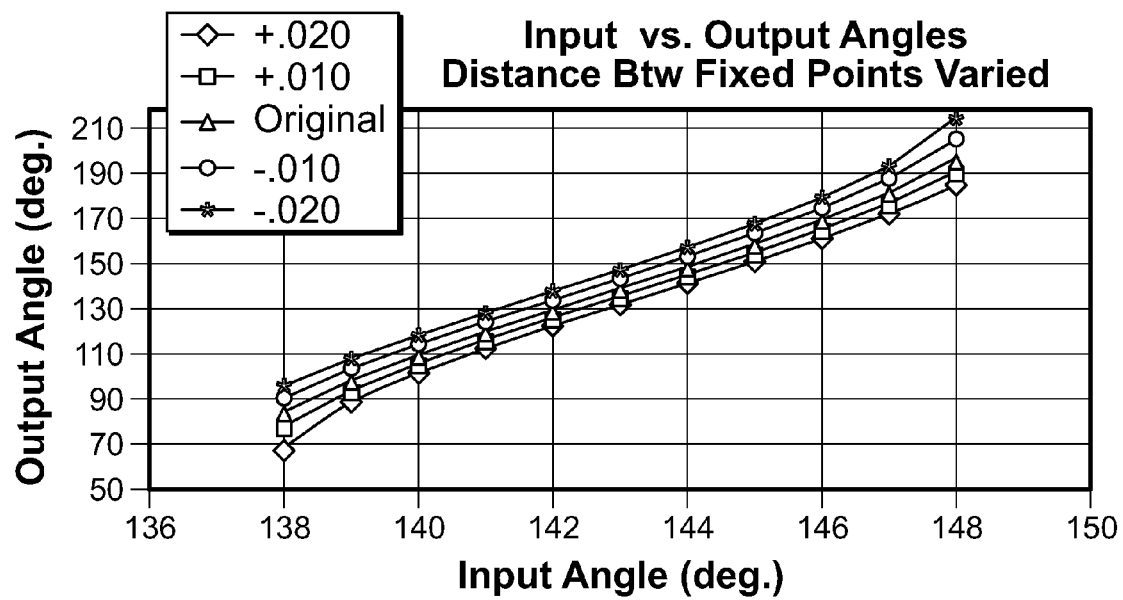

In another exemplary embodiment of the present disclosure and as depicted in FIG. 12, device 10/sub-assembly 20 may include a crank pin 429 and a crank body 428. Crank pin 429 and crank body 428 may be structurally and/or functionally similar to crank pin 29 and crank body 28 discussed above, with some differences.

Crank pin 429 is typically fastened or secured to crank body 428 via a variety of fastening/securing means (e.g., welding, brazing, soldering, etc.). In general, a cam member 450 or the like is positioned adjacent to at least a portion of crank body 428. Cam member 450 typically includes an engagement head or member 453. In one embodiment, engagement member 453 is substantially egg-shaped or the like, although the present disclosure is not limited thereto. Engagement member 453 typically includes a slot or groove 457 that allows crank body 428 to travel within groove 457 when crank body 428 moves/rotates in response to movement of condition responsive element 11.

Rotation of cam member 450 (e.g., clockwise or counterclockwise) changes the distance D between the axis A of crank pin 429 and the axis B of crank body 428, thereby adjusting/changing the span of device 10/sub-assembly 20 having crank pin 429, crank body 428 and cam member 450. In other words, the span of device 10/sub-assembly 20 may be adjusted by changing the distance between the crank pin 429 and the crank body 428 via movement/rotation of cam member 450.

In other exemplary embodiments of the present disclosure, FIGS. 13A-13E depict alternative crank pins 429A-E, crank bodies 428A-E and cam members 450A-E. Similar to the description above, the span of device 10/sub-assembly 20 may be adjusted by changing the distance between the crank pins 429A-E and the crank bodies 428A-E via movement/rotation of cam members 450A-E, respectively. FIGS. 14-19 depict testing data, charts and tables that illustrate test results for various exemplary measuring devices and/or measuring device sub-assemblies of the present disclosure.

Whereas the disclosure has been described principally in connection with a helical coil or the like for a pressure gauge construction, such description has been utilized only for purposes of disclosure and is not intended as limiting the disclosure. To the contrary, it is to be recognized that the crank assembly/sub-assembly is capable of use with any condition responsive element producing motion in response to condition changes to which it is sensitive.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A measuring device assembly comprising:
   a bracket member;
   a condition responsive element mounted with respect to the bracket member, the condition responsive element including an element inlet and an output end configured to produce motion in response to condition changes: (i) received at the element inlet and (ii) to which the condition responsive element is sensitive; and
   a coupler member having a first end and a second end, the first end mounted with respect to the output end of the condition responsive element via a pin member and the second end mounted with respect to a crank pin of a crank assembly, the coupler member configured and dimensioned to communicate correlated but amplified angular motion of the condition responsive element to a rotatable crank body of the crank assembly for operating an indicator relative to condition changes on a dial face;
   wherein at least a portion of the crank pin defines a first longitudinal axis and at least a portion of the crank body defines a second longitudinal axis; and
   wherein the span or degrees of indicator rotation is adjusted by changing the distance between the first longitudinal axis and the second longitudinal axis.

2. The assembly of claim 1, wherein the bracket member is mounted with respect to a housing or a case.

3. The assembly of claim 1, wherein the condition responsive element is a helical coil or a Bourdon tube.

4. The assembly of claim 1, wherein the condition changes are pressure or temperature changes.

5. The assembly of claim 1, wherein the element inlet is mounted with respect to a pressure fitting.

6. The assembly of claim 1, wherein the crank pin is mounted with respect to the crank body by inserting a first end of the crank pin through an aperture or opening of the crank body.

7. The assembly of claim 1, wherein the first longitudinal axis and the second longitudinal axis are substantially parallel to one another.

8. The assembly of claim 1 further including a distance gauge member that is configured and dimensioned to allow a user to adjust the span or degrees of indicator rotation by changing the distance between the first longitudinal axis and the second longitudinal axis.

9. The assembly of claim 8, wherein the distance gauge member includes a plurality of outer apertures, with each outer aperture configured and dimensioned to allow at least a portion of the crank pin to be inserted therein or therethrough;
   wherein the distance gauge member includes an inner aperture, with the inner aperture configured and dimensioned to allow at least a portion of the crank body to be inserted therein or therethrough; and
   wherein each outer aperture is positioned or located on the distance gauge member a different distance from the inner aperture.

10. A method for fabricating a measuring device assembly comprising:
    providing a bracket member;
    providing a condition responsive element;
    mounting the condition responsive element with respect to the bracket member, the condition responsive element including an element inlet and an output end configured to produce motion in response to condition changes: (i) received at the element inlet and (ii) to which the condition responsive element is sensitive;
    providing a coupler member having a first end and a second end;
    mounting the first end of the coupler member with respect to the output end of the condition responsive element via a pin member;
    mounting the second end of the coupler member with respect to a crank pin of a crank assembly, the coupler member configured and dimensioned to communicate correlated but amplified angular motion of the condition responsive element to a rotatable crank body of the crank assembly for operating an indicator relative to condition changes on a dial face;
    wherein at least a portion of the crank pin defines a first longitudinal axis and at least a portion of the crank body defines a second longitudinal axis; and
    wherein the span or degrees of indicator rotation may be adjusted by changing the distance between the first longitudinal axis and the second longitudinal axis.

11. The method of claim 10, wherein the bracket member is mounted with respect to a housing or a case.

12. The method of claim 10, wherein the condition responsive element is a helical coil or a Bourdon tube.

13. The method of claim 10, wherein the condition changes are pressure or temperature changes.

14. The method of claim 10, further comprising the step of mounting the element inlet with respect to a pressure fitting.

15. The method of claim 10, further comprising the step of mounting the crank pin with respect to the crank body by inserting a first end of the crank pin through an aperture or opening of the crank body.

16. The method of claim 10, wherein the first longitudinal axis and the second longitudinal axis are substantially parallel to one another.

17. The method of claim 10 further including providing a distance gauge member that is configured and dimensioned to allow a user to adjust the span or degrees of indicator rotation by changing the distance between the first longitudinal axis and the second longitudinal axis.

18. The method of claim 17, wherein the distance gauge member includes a plurality of outer apertures, with each outer aperture configured and dimensioned to allow at least a portion of the crank pin to be inserted therein or therethrough;
   wherein the distance gauge member includes an inner aperture, with the inner aperture configured and dimensioned to allow at least a portion of the crank body to be inserted therein or therethrough; and
   wherein each outer aperture is positioned or located on the distance gauge member a different distance from the inner aperture.

19. A measuring device assembly comprising:
   a bracket member;
   a condition responsive element mounted with respect to the bracket member, the condition responsive element including an element inlet and an output end configured to produce motion in response to condition changes: (i) received at the element inlet and (ii) to which the condition responsive element is sensitive; and
   a coupler member having a first end and a second end, the first end mounted with respect to the output end of the condition responsive element via a pin member and the second end mounted with respect to a crank pin of a crank assembly, the coupler member configured and dimensioned to communicate correlated but amplified angular motion of the condition responsive element to a rotatable crank body of the crank assembly for operating an indicator relative to condition changes on a dial face;
   wherein the crank pin is mounted with respect to the crank body by inserting a first end of the crank pin through an aperture or opening of the crank body;
   wherein at least a portion of the crank pin defines a first longitudinal axis and at least a portion of the crank body defines a second longitudinal axis;
   wherein the span or degrees of indicator rotation is adjusted by changing the distance between the first longitudinal axis and the second longitudinal axis; and
   wherein the first longitudinal axis and the second longitudinal axis are parallel to one another.

20. The assembly of claim 19 further including a distance gauge member that is configured and dimensioned to allow a user to adjust the span or degrees of indicator rotation by changing the distance between the first longitudinal axis and the second longitudinal axis;
   wherein the distance gauge member includes a plurality of outer apertures, with each outer aperture configured and dimensioned to allow at least a portion of the crank pin to be inserted therein or therethrough;
   wherein the distance gauge member includes an inner aperture, with the inner aperture configured and dimensioned to allow at least a portion of the crank body to be inserted therein or therethrough; and
   wherein each outer aperture is positioned or located on the distance gauge member a different distance from the inner aperture.

* * * * *